United States Patent
Mather et al.

(10) Patent No.: US 10,498,545 B2
(45) Date of Patent: Dec. 3, 2019

(54) SYSTEMS AND METHODS FOR AUTOMATED BROADBAND DISTRIBUTION POINT UNIT POWERING

(71) Applicants: CommScope Connectivity UK Limited, London (GB); CommScope Connectivity Belgium BVBA, Kessel-Lo (BE)

(72) Inventors: David James Mather, Cheshire (GB); Ian Miles Standish, North Wales (GB); Jan Jozef Julia Maria Erreygers, Tielt-Winge (BE)

(73) Assignees: CommScope Connectivity Belgium BVBA, Kessel-Lo (BE); CommScope Connectivity UK Limited, London (GB)

( * ) Notice: Subject to any disclaimer, the term of this patent is extended or adjusted under 35 U.S.C. 154(b) by 5 days.

(21) Appl. No.: 15/745,389

(22) PCT Filed: Jul. 13, 2016

(86) PCT No.: PCT/EP2016/066595
§ 371 (c)(1),
(2) Date: Jan. 16, 2018

(87) PCT Pub. No.: WO2017/012934
PCT Pub. Date: Jan. 26, 2017

(65) Prior Publication Data
US 2019/0097820 A1    Mar. 28, 2019

(51) Int. Cl.
*H04L 12/10* (2006.01)
*H04B 3/44* (2006.01)
(Continued)

(52) U.S. Cl.
CPC ............... *H04L 12/10* (2013.01); *H04B 3/44* (2013.01); *H04B 3/542* (2013.01);
(Continued)

(58) Field of Classification Search
CPC .. H04M 19/001; H04M 19/08; H04M 11/062; H04M 3/005; H04L 12/10; H04L 12/66
(Continued)

(56) References Cited

U.S. PATENT DOCUMENTS 3,852,675 A * 12/1974 Stewart .................... H03D 1/10
327/47
5,909,463 A * 6/1999 Johnson ................... H04L 5/143
370/276
(Continued)

FOREIGN PATENT DOCUMENTS

EP    1279288 A1    1/2003
EP    2472792 A2    7/2012
(Continued)

OTHER PUBLICATIONS

"Access, Terminals, Transmission and Multiplexing (ATTM); European Requirements for Reverse Powering of Remote Access Equipment", Technical Specification, ETSI TS 101 548 V1.1.1, Sep. 2014, pp. 1-30, Publisher: European Telecommunications Standards Institute.
(Continued)

*Primary Examiner* — Alexander Krzystan
(74) *Attorney, Agent, or Firm* — Fogg & Powers LLC

(57) ABSTRACT

Systems and methods for automated broadband distribution point unit powering are provided. In one embodiment, an upstream service disconnect unit comprises: a processor; a relay control; and a switching relay coupled to a upstream service delivery unit, a first end of an electrical conductor span, and a access network distribution point unit that is
(Continued)

coupled to an optical fiber network, wherein a second end of the electrical conductor span is coupled to a customer premises equipment DSL modem; wherein the upstream service disconnect unit is configured to energize the processor, the relay control, and the switching relay and to operate the switching relay to couple the electrical conductor span with the access network distribution point unit by tapping power of a trigger signal drawn from the electrical conductor span.

59 Claims, 13 Drawing Sheets

(51) Int. Cl.
  *H04L 12/28* (2006.01)
  *H04L 12/40* (2006.01)
  *H04M 19/08* (2006.01)
  *H04B 3/54* (2006.01)

(52) U.S. Cl.
  CPC .... *H04L 12/2878* (2013.01); *H04L 12/40045* (2013.01); *H04M 19/08* (2013.01)

(58) Field of Classification Search
  USPC ..... 379/322, 323, 324, 413, 413.01, 413.02, 379/413.03, 413.04, 93, 22.04, 165
  See application file for complete search history.

(56) References Cited

U.S. PATENT DOCUMENTS

| | | | |
|---|---|---|---|
| 2002/0150122 A1* | 10/2002 | Arai | H04L 1/243 370/465 |
| 2006/0077968 A1* | 4/2006 | Pitsoulakis | H04M 3/005 370/352 |
| 2008/0181393 A1* | 7/2008 | Brost | H04L 12/66 379/413 |
| 2016/0295011 A1* | 10/2016 | Schalk | H04M 3/007 |

FOREIGN PATENT DOCUMENTS

| | | |
|---|---|---|
| EP | 2953292 A1 | 12/2015 |
| WO | 0174077 A1 | 10/2001 |
| WO | 2011106761 A1 | 9/2011 |
| WO | 2014134798 A1 | 9/2014 |
| WO | 2015139036 A1 | 9/2015 |

OTHER PUBLICATIONS

"Architecture and Requirements for Fiber to the Distribution Point", Final Ballot Candidate, Broadband Forum, Revision: Jun. 24, 2015.
International Searching Authority, "International Search Report and Written Opinion from PCT Application No. PCT/EP2016/066595 dated Oct. 7, 2016", pp. 1-12, Published in EP.
Smits et al., "Unified Start-up Protocol [USP]", ETSI, May 29, 2015, pp. 1-4.
European Patent Office, "Extended European Search Report from EP Application No. 19173990.3 dated Aug. 5, 2019", from Foreign Counterpart to U.S. Appl. No. 15/745,389, pp. 1-8, Published: EP.

* cited by examiner

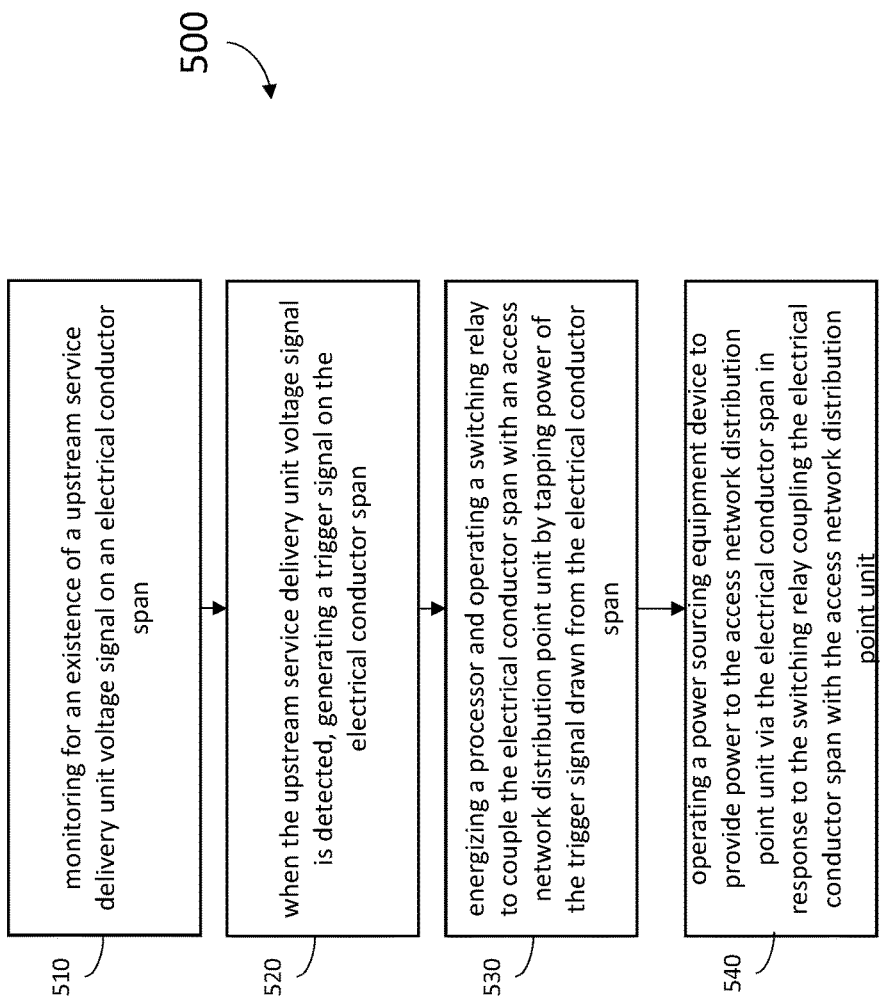

SYSTEMS AND METHODS FOR AUTOMATED BROADBAND DISTRIBUTION POINT UNIT POWERING

CROSS-REFERENCE TO RELATED APPLICATIONS

The present application is a § 371 U.S. National Stage Application of International Application No. PCT/EP/2016/066595 titled "SYSTEMS AND METHODS FOR AUTOMATED BROADBAND DISTRIBUTION POINT UNIT POWERING", filed on Jul. 13, 2016, which claims priority to and the benefit of U.S. Provisional Patent Application No. 62/194,140, entitled "SYSTEMS AND METHODS FOR AUTOMATED BROADBAND DISTRIBUTION POINT UNIT POWERING", filed on Jul. 17, 2015, and which also claims priority to and the benefit of U.S. Provisional Patent Application No. 62/213,899, entitled "SYSTEMS AND METHODS FOR AUTOMATED BROADBAND DISTRIBUTION POINT UNIT POWERING", filed on Sep. 3, 2015, all of which are incorporated herein by reference in their entirety.

BACKGROUND

In a Digital Subscriber Line (DSL) access network, the Distribution Point Unit (DPU) provides the interface where the DSL access network is coupled to one or more customer premises. As DSL technologies have advanced, the DSL access network has become increasingly fiber optic based in order to support faster data rates such that optical fibers now may be distributed from the DSL service provider's central office (CO) all the way to the DPU. This configuration has become known in the industry as Fiber-to-the-Distribution-Point (FTTdP). The remaining connection from the DPU to the customer premise is typically comprised of one or more twisted-pair electrical conductors such as twisted pair copper wires. In addition to data services, traditional Plain-Old-Telephone-Service (POTS) is very often provided to the customer premises using these same twisted-pair electrical conductors.

Because the DPU is coupled to the CO over non-electrically conducting optical fiber, electrical power to operate the DPU electronics must be delivered to the DPU via another path. Utilizing the electrical service provided to the customer premises is one option since electrical power can be sent back to the DPU over the twisted-pair electrical conductors that connect the DPU with the customer premises. However, a problem arises when the twisted-pair electrical conductors are currently connected to the POTS network via a central office exchange because the central office exchange places a −48 volt DC potential across the twisted-pair electrical conductors which it utilizes for both POTS signaling and voice communication purposes. Attempting to separately energize the twisted pair from the customer premises would conflict with the −48 volt DC potential already on the conductors. Further, the central office exchange power on the twisted-pair electrical conductors is itself inadequate for powering the DPU and attempting to utilize it for this purpose would otherwise interfere with operation of the central office exchange. While a technician could be sent to disconnect the connection with the central office exchange, such a process would need to be performed each time a new customer orders DSL service, thus defeating the various benefits of enabling customers to simply self-install a DSL modem in order to start the DSL service.

For the reasons stated above and for other reasons stated below which will become apparent to those skilled in the art upon reading and understanding the specification, there is a need in the art for alternate systems and methods for providing automated DSL distribution point unit powering.

DRAWINGS

Embodiments of the present invention can be more easily understood and further advantages and uses thereof more readily apparent, when considered in view of the description of the preferred embodiments and the following figures in which:

FIG. 5 is a flow chart illustrating a method embodiment of the present disclosure;

Figure 7:
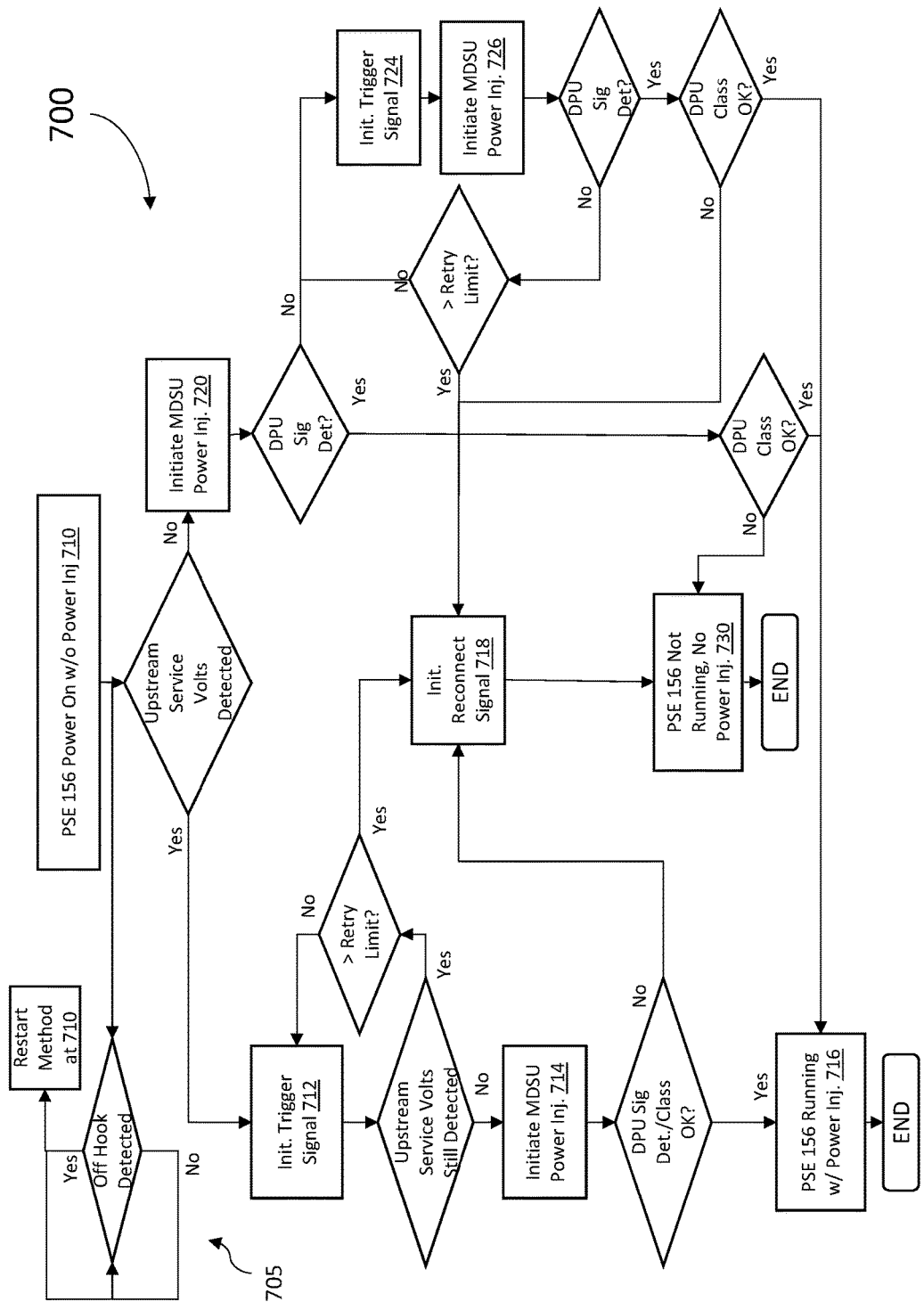
Figures 8A, 8B:
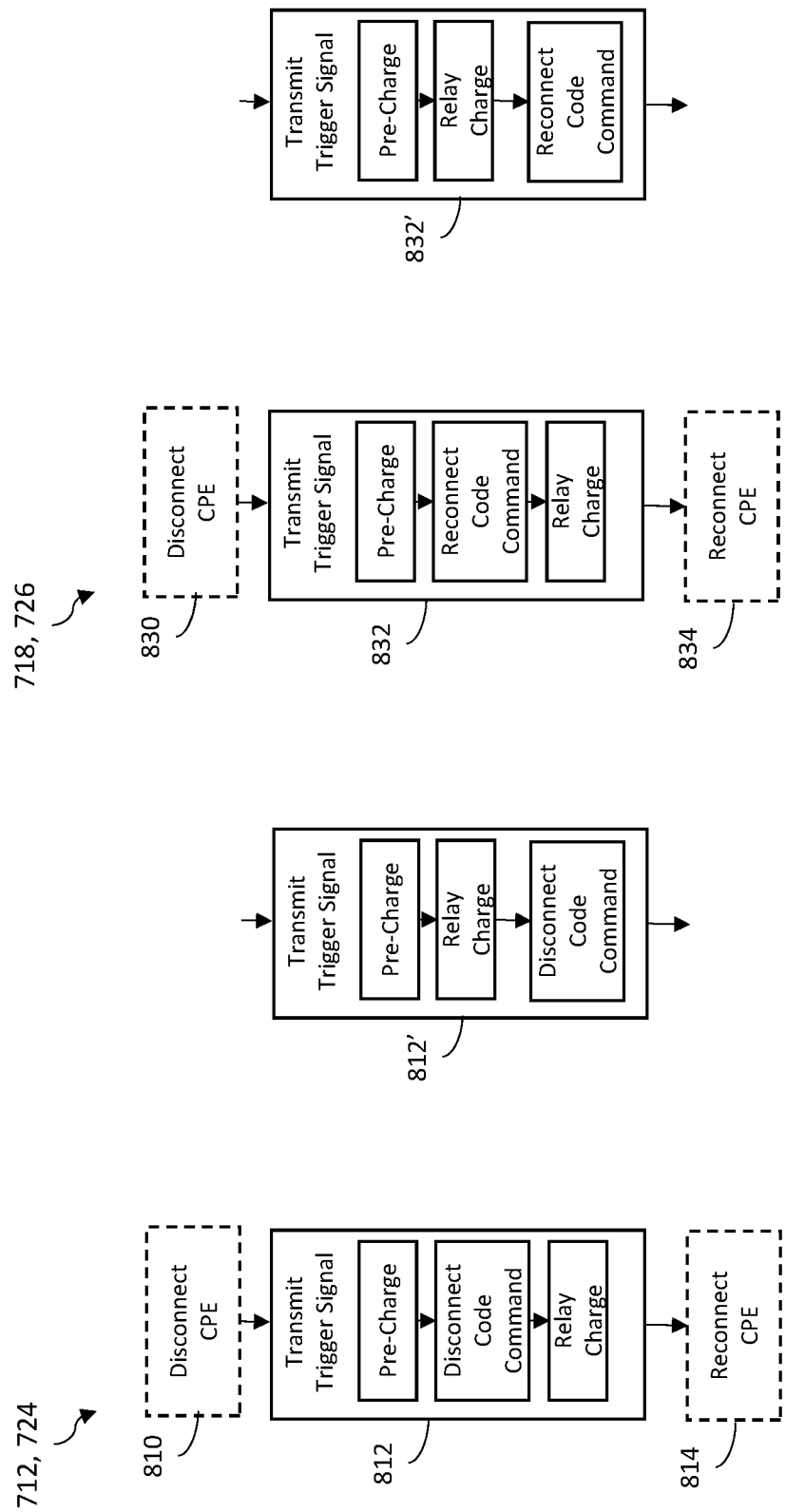

FIG. 7 a flow chart illustrating a method embodiment of the present disclosure; and FIGS. 8A and 8B are flow charts illustrating a method embodiment of the present disclosure.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
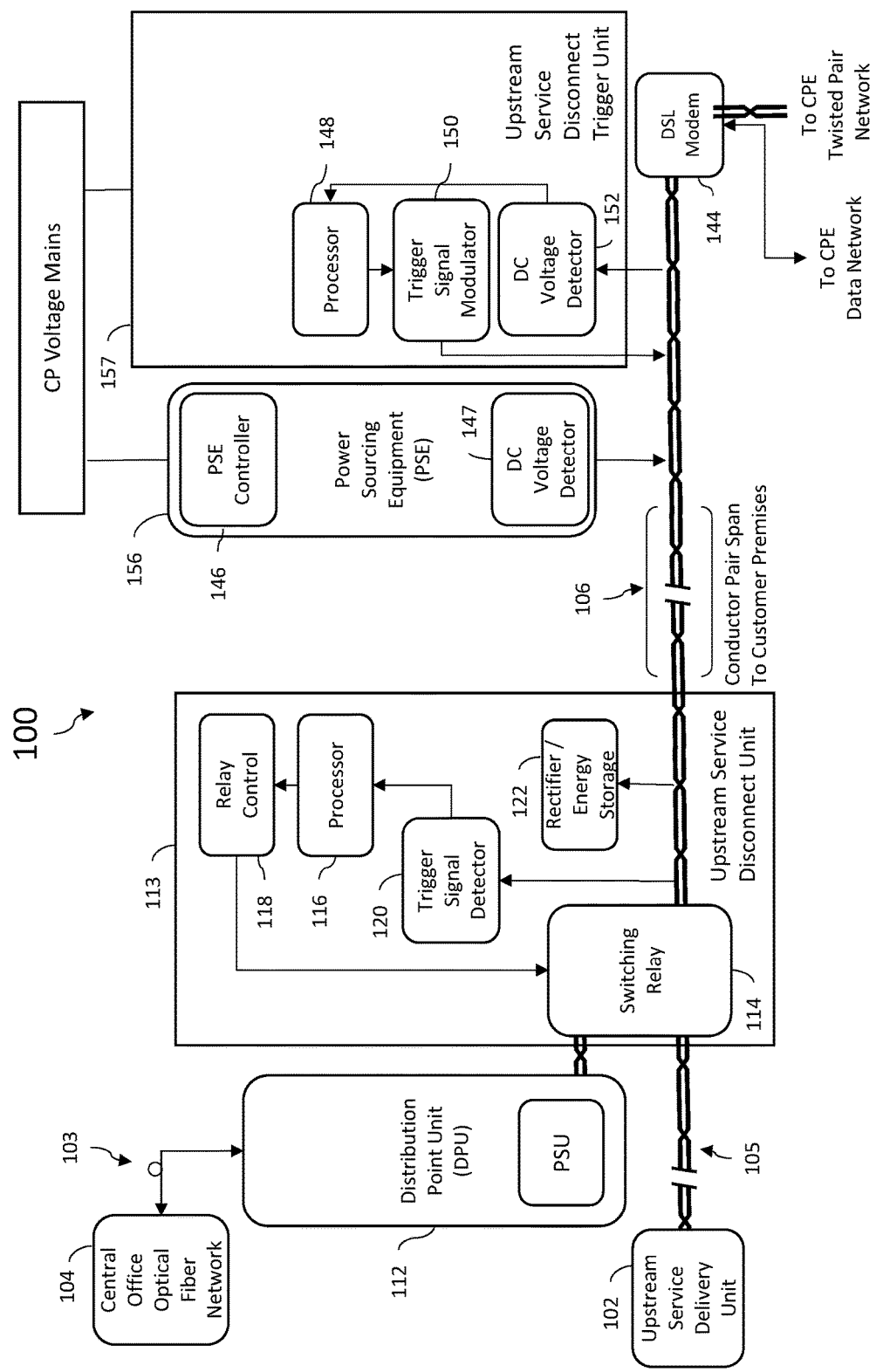
FIG. 1 is a diagram of a broadband access network of one embodiment of the present disclosure.

FIG. 1 is a block diagram illustrating a broadband access network generally at 100. In one embodiment, broadband access network is a DSL access network. More specifically, FIG. 1 illustrates an example network interface between an access network DPU 112 (which may be a DSL DPU) and a Power Sourcing Equipment (PSE) 156 unit that will power the DPU 112 over a span of twisted-pair electrical conductors 106. FIG. 1 describes a general implementation with more specific implementations of network 100 illustrated in the following figures. The DPU 112 may be implemented as a utility pole mounted device, or in a vault or electronics cabinet near or in the customer premises (which may be, for example, a residential or commercial building). The conductor span 106 couples the DPU 112 to the customer premises. With embodiments of the present disclosure, automatic electrical powering of the DPU 112 by the PSE 156 may be accomplished even when central office service voltages (such as POTS service voltages, for example) are present on the conductor span 106 through the utilization of an Upstream Service Disconnect Unit 113 located on the DPU 112 side of span 106, and an Upstream Service Disconnect Trigger Unit 157 located on the PSE 156 side of span 106. Various example implementations of the Upstream Service Disconnect Unit 113 and Upstream Service Disconnect Trigger Unit 157 are describe below.

As shown in FIG. 1, Upstream Service Disconnect Unit 113 is coupled to an upstream service delivery unit 102 (which may comprise a Central Office POTS Exchange, for example) by at least one set of electrical conductors 105 via a switching relay 114. Electrical conductors 105 may comprise one or more sets of twisted-pair conductors such as twisted pair copper wires. Prior to the activation of DSL service, PSE 156 remains deactivated and switching relay 114 is switched to simply pass upstream service (such as POTS service) and if present also legacy DSL service (ADSL or VDSL) on to the customer premises via conductor span 106. Sometimes, a legacy DSL service may already be present on the conductors 105. When the customer is connected to the DPU 112 the DSL service can be upgraded to a higher speed service because the loop length of the DSL circuit is reduced. The new service can be a higher speed VDSL service or a G.fast service.

Initialization of DSL service through the DPU 112 begins with the activation of Upstream Service Disconnect Trigger Unit 157. As shown in FIG. 1, Upstream Service Disconnect Trigger Unit 157 comprises a DC Voltage Detector 152 and a Trigger Signal Modulator 150, both of which are coupled to a processor 148. Upstream Service Disconnect Trigger Unit 157 and PSE 156 may both be powered from the voltage mains 155 available at the customer premises, or in some implementations may be powered from an alternate source. Further, in some embodiments, Upstream Service Disconnect Trigger Unit 157 and PSE 156 may be integrated together as a single device.

When Upstream Service Disconnect Trigger Unit 157 is initially powered, DC Voltage Detector 152 monitors the conductor span 106 for the existence of an upstream service delivery unit generated DC voltage signal. When a DC voltage signal is detected, processor 148 activates trigger signal modulator 150 to transfer a trigger signal onto the conductor span 106. In alternate embodiments and implementations, such as those described below, the trigger signal may comprise a voltage modulated signal or a current modulated signal, either of which is tailored not to interfere with the operation of the upstream service delivery unit 102.

Upstream Service Disconnect Unit 113 comprises a trigger signal detector 120 and a rectifier-energy storage device 122. At the Upstream Service Disconnect Unit 113, the trigger signal is received from the Upstream Service Disconnect Trigger Unit 157 over the conductor span 106. Rectifier-energy storage device 122 comprises both a DC rectifier and an energy storage component. In some implementations, the energy storage component may comprise, for example, a capacitive storage device that is charged by the output of the rectifier. That is, the rectifier rectifies the alternating voltage present on the conductor span 106 resulting from the trigger signal, and stores a portion of the energy obtained from the trigger signal in the energy storage component. Processor 116, Relay Control 118 and Trigger Signal Detector 120 are each powered by the charge stored in rectifier-energy storage device 122. When a sufficient charge is available, processor 116 becomes operable. Processor 116 also obtains an input from trigger signal detector 120 to confirm whether the trigger signal is present on conductor span 106. When the trigger signal is present, processor 116 activates relay control 118 to operate switching relay 114 (which may be implemented using a bistable relay). Operation of switching relay 114 electrically disconnects conductor span 106 from the conductor span 105 to the upstream service delivery unit 102 and re-connects conductor span 106 to the DPU 112. In one embodiment, DPU 112 comprises a DSL Access Multiplexer (DSLAM) that, once energized, connects one or more high-speed digital communications channels from the CO Optical Fiber Network 104 with a DSL data link established over conductor span 106.

Upon operating the switching relay 114, the loss of the Central Office DC potential from the upstream service delivery unit 102 is detected by DC Voltage detector 152. In response, processor 140 deactivates trigger signal modulator 150. PSE 156 also contains a DC Voltage Detector 147. Once the PSE Voltage Detector 147 detects the absence of DC voltage, the PSE 156 will start its startup protocol. After checking the conductor span 106 for possible fault conditions, PSE 156 provides DC power to conductor span 106 which is used to energize DPU 112. The now energized DPU 112 establishes the DSL data link over conductor span 106 with CPE DSL Modem 144 (which may, for example, be implemented using a VDSL or G.fast DSL modem) to provide data service to the customer premises. Although the DPU 112 and the Upstream Service Disconnect Unit 113 are illustrated as separate elements, it should be appreciated that in alternate implementations, the Upstream Service Disconnect Unit 113 may be integrated into the DPU 112.

Figure 2A:
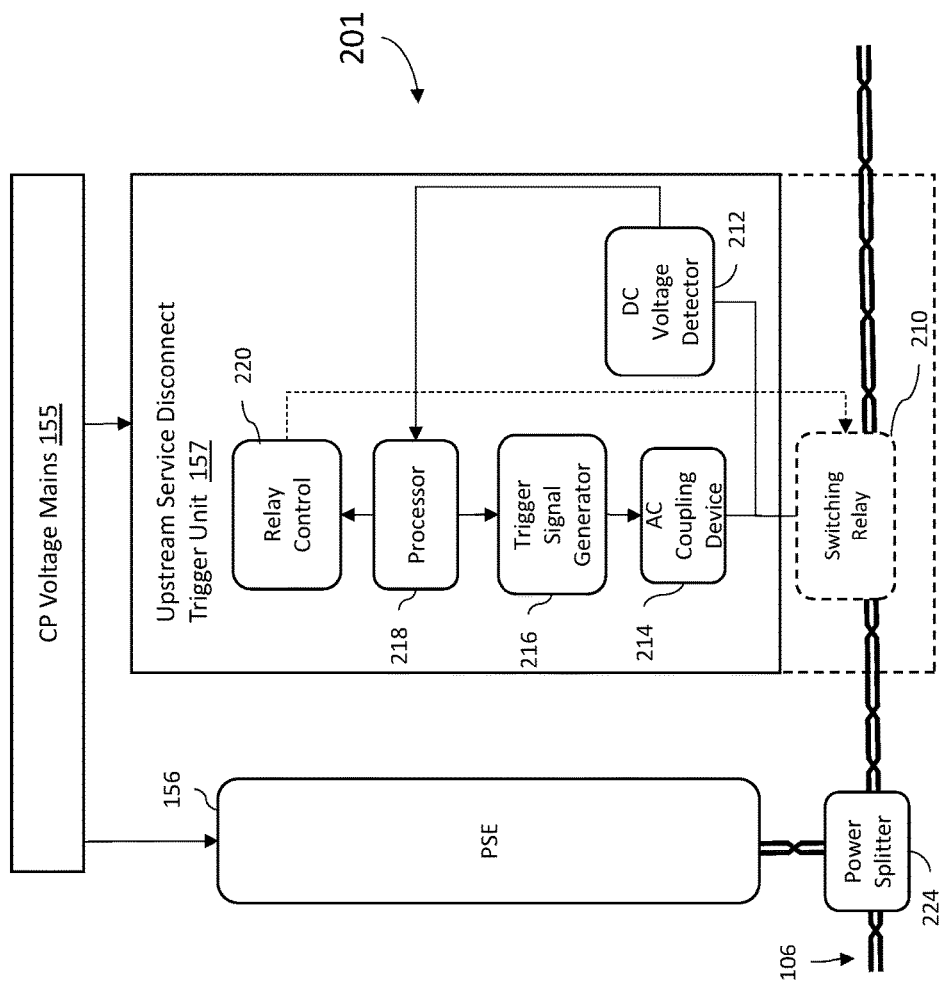
FIG. 2A is a diagram of a Power Sourcing Equipment Device paired with a Upstream Service Disconnect Trigger Unit of one embodiment of the present disclosure.
Figure 2B:
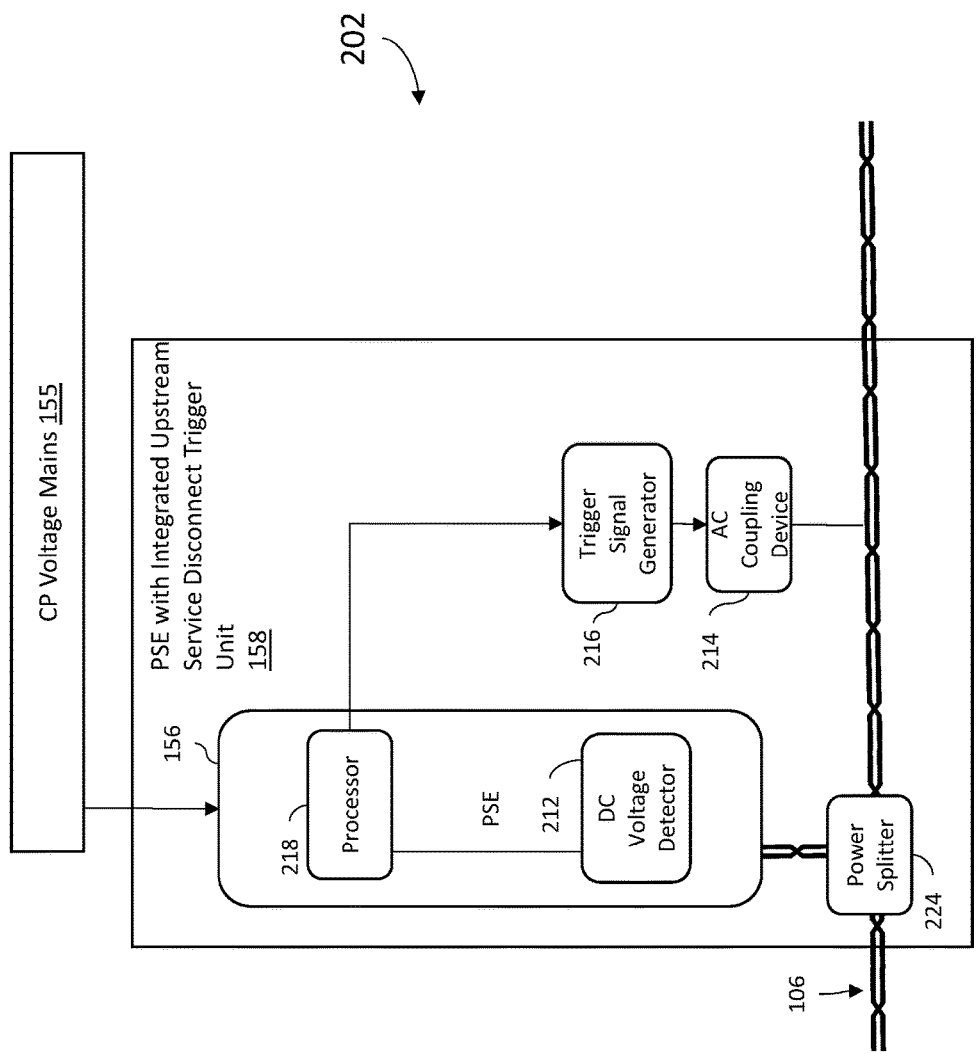
FIG. 2B is a diagram of a Power Sourcing Equipment Device integrated with a Upstream Service Disconnect Trigger Unit of one embodiment of the present disclosure.
Figure 2C:
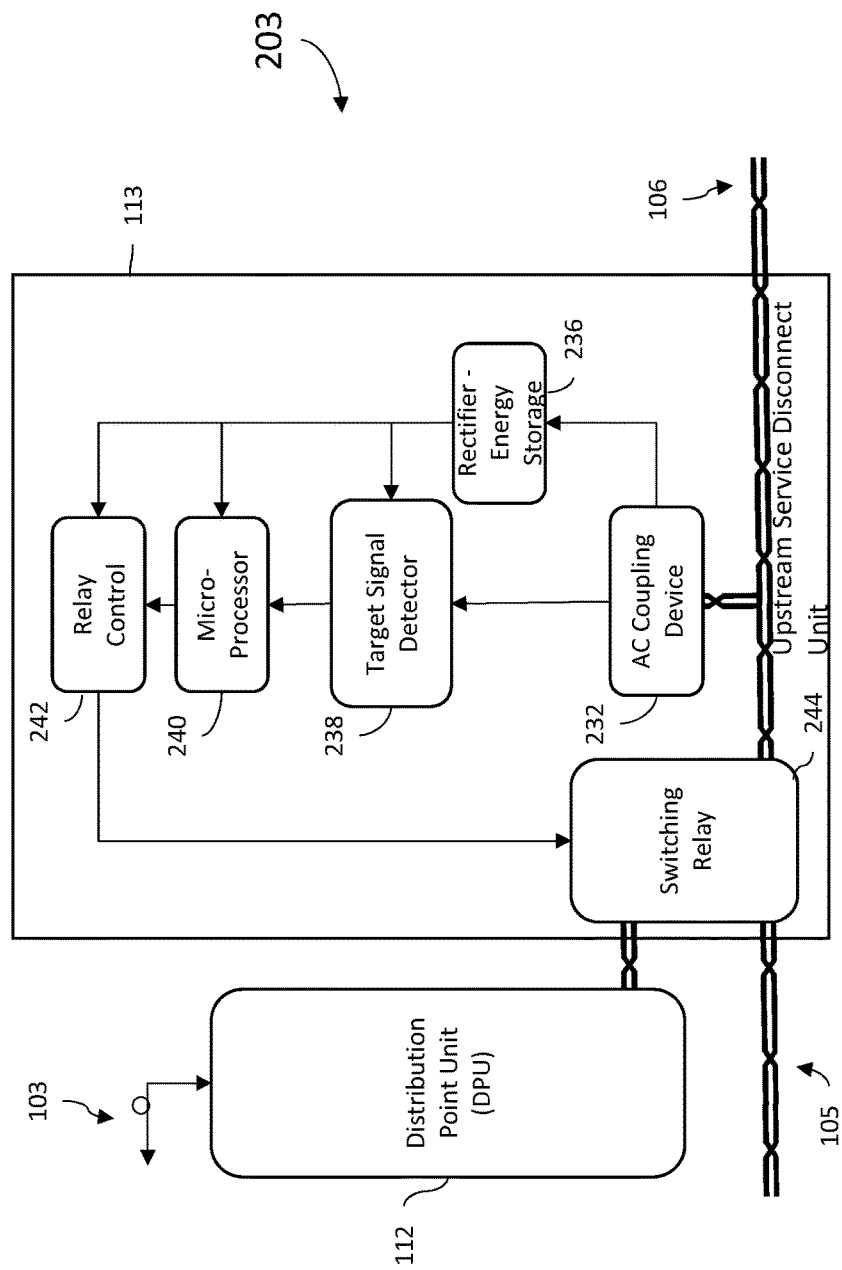
FIG. 2C is a diagram of a Distribution Point Unit paired with a Upstream Service Disconnect Unit of one embodiment of the present disclosure.

FIGS. 2A, 2B and 2C illustrate example implementations of Upstream Service Disconnect Unit 113 and Upstream Service Disconnect Trigger Unit 157 where a low frequency voltage modulated signal is applied to conductor span 106 as the trigger signal. Starting with FIG. 2A, one example implementation for Upstream Service Disconnect Trigger Unit 157 is shown at 201. Power Sourcing Equipment 156 is also shown, coupled to the conductor span 106 via a power splitter. On activation of the Upstream Service Disconnect Trigger Unit 157 (which may occur upon receiving power from CP Voltage Mains 155, for example) DC Voltage Detector 212 begins to monitor conductor span 106 for the existence of the upstream service delivery unit generated DC voltage signal. When that DC voltage signal is detected, processor 218 activates trigger signal generator 216 which produces an AC voltage modulated signal (which may be a square wave or a sine wave, or a more complex modulation) on the wires of the conductor span 106. The modulation frequency of the trigger signal is high enough to be above the POTS voice band carried over conductor span 106, but not so high at to be attenuated by the high impedance (for example, >1 kOhm) ac coupling device 214 that connects the trigger signal generator 216 to the conductor span 106. In alternate embodiments, the ac coupling device 214 may comprise an inductive device such as a transformer, or a capacitive device such as a series of capacitors. In one embodiment, Upstream Service Disconnect Trigger Unit 157 may comprise or otherwise be coupled to an optional switching relay 210 through which the conductor span 106 may be disconnected from the CPE network before the trigger signal generator 216 begins outputting the trigger signal. For example, in one embodiment, processor 218 outputs a signal to relay control 220 to operate switching relay 210 (which may comprise a bistable relay device) to disconnect conductor span 106 from the CPE network and instead connect it to the trigger signal generator 216 and DC Voltage Detector 212 on activation of the Upstream Service Disconnect Trigger Unit 157 and then begin to monitor conductor span 106 for the existence of the upstream service delivery unit generated DC voltage signal. In this embodiment the AC coupling device 214 can be a low impedance coupling. After the disconnection of the POTS service, the relay 210 will reconnect the pair 106 with the modem 144. In that state the AC coupling device is not connected anymore to the pair 106 and therefore cannot impair the DSL service.

FIG. 2B illustrates an alternative implementation at 202 of a PSE with integrated Upstream Service Disconnect Trigger Unit 158 of one embodiment of the present disclosure. The PSE with integrated Upstream Service Disconnect Trigger Unit 158 is functionally identical to the implementation described in FIG. 2A, however the processor 218 and DC voltage detector 212 are implemented using resources within the CPE 156.

In FIG. 2C one example implementation is illustrated at 203 for an Upstream Service Disconnect Unit 113 for use with low frequency voltage modulated trigger signal such as generated by the trigger signal generator 216 discussed in either of FIG. 2A or 2B above. Upstream Service Disconnect Unit 113 comprises an AC coupling Device 232 that provides a high impedance tap to tap off the trigger signal from conductor span 106. A high impedance coupling device (for example, >1 kOhm) is used here to avoid loading the conductor span 106 in such a way as to interfere with the POTS and/or DSL signals still on the line from upstream service delivery unit 102. In alternate embodiments, the ac coupling device 232 may comprise an inductive device such as a transformer, or a capacitive device such as a series of capacitors. As discussed above, the modulated trigger signal present on conductor span 106 is weak enough not to interfere with upstream service delivery unit 102, but carries sufficient power to be rectified and stored by rectifier-energy storage device 236. Rectifier-energy storage device 236 comprises both a DC rectifier and an energy storage component. In some implementations, the energy storage component may comprise, for example, a capacitive storage device that is charged by the output of the rectifier. The rectifier rectifies the alternating voltage trigger signal, and stores a portion of the energy obtained from the trigger signal in the energy storage component. Processor 240, Relay Control 242 and Trigger Signal Detector 238 are each powered by the charge stored in rectifier-energy storage device 236. When a sufficient charge is available, processor 240 becomes operable. Processor 240 also obtains an input from trigger signal detector 238 to confirm whether the trigger signal is present on conductor span 106. In one embodiment, trigger signal detector 238 comprises a demodulator tuned to the modulation frequency of trigger signal generator 216 to detect the trigger signal on conductor span 106. When the trigger signal is present, processor 240 activates relay control 242 to operate switching relay 244 (which may be implemented using a bistable relay). Operation of switching relay 244 electrically disconnects conductor span 106 from the conductor span 105 to the upstream service delivery unit 102 and re-connects conductor span 106 to the DPU 112. In some embodiments, the trigger signal itself may also be modulated with a code or signal by trigger signal generator 216. The modulation of the trigger signal may be utilized by trigger signal detector 238 to further confirm the authenticity of the trigger signal or communicate information between the Upstream Service Disconnect Trigger Unit 157 and the Upstream Service Disconnect Unit 113.

Figure 3A:
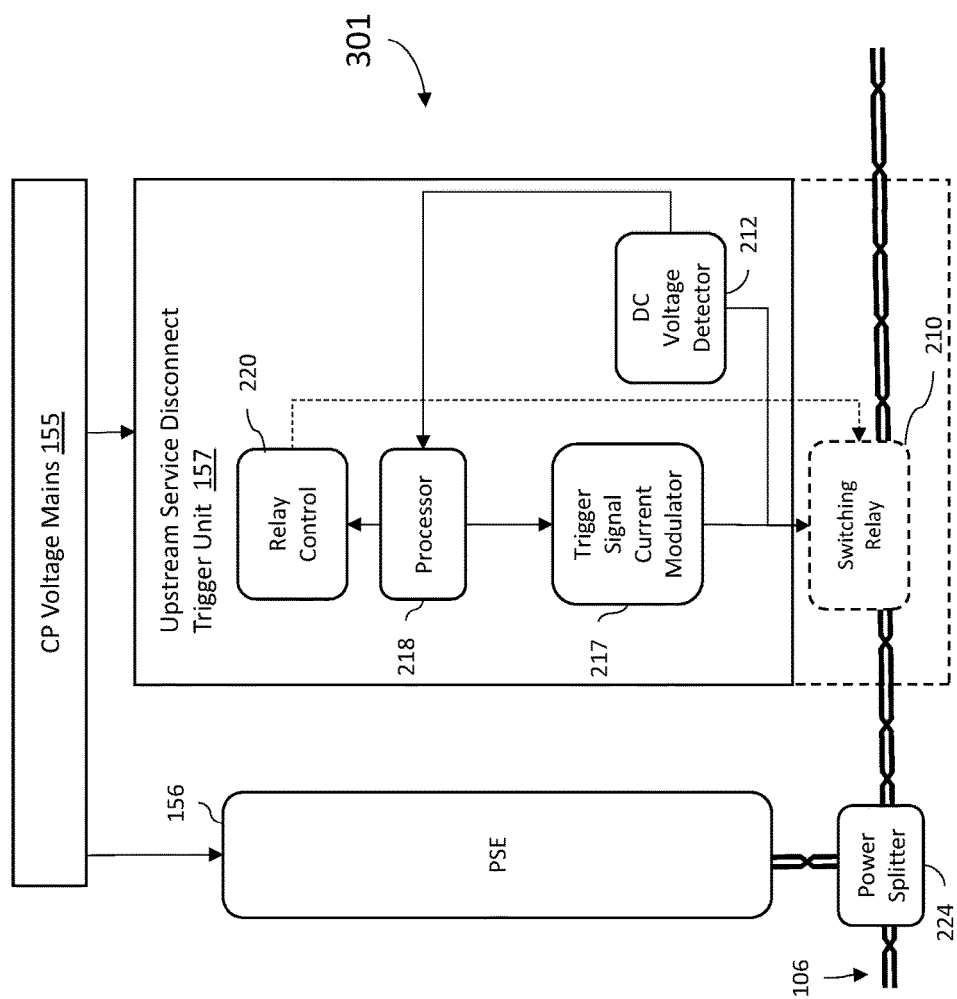
FIG. 3A is a diagram of a Power Sourcing Equipment Device paired with a Upstream Service Disconnect Trigger Unit of one embodiment of the present disclosure.
Figure 3B:
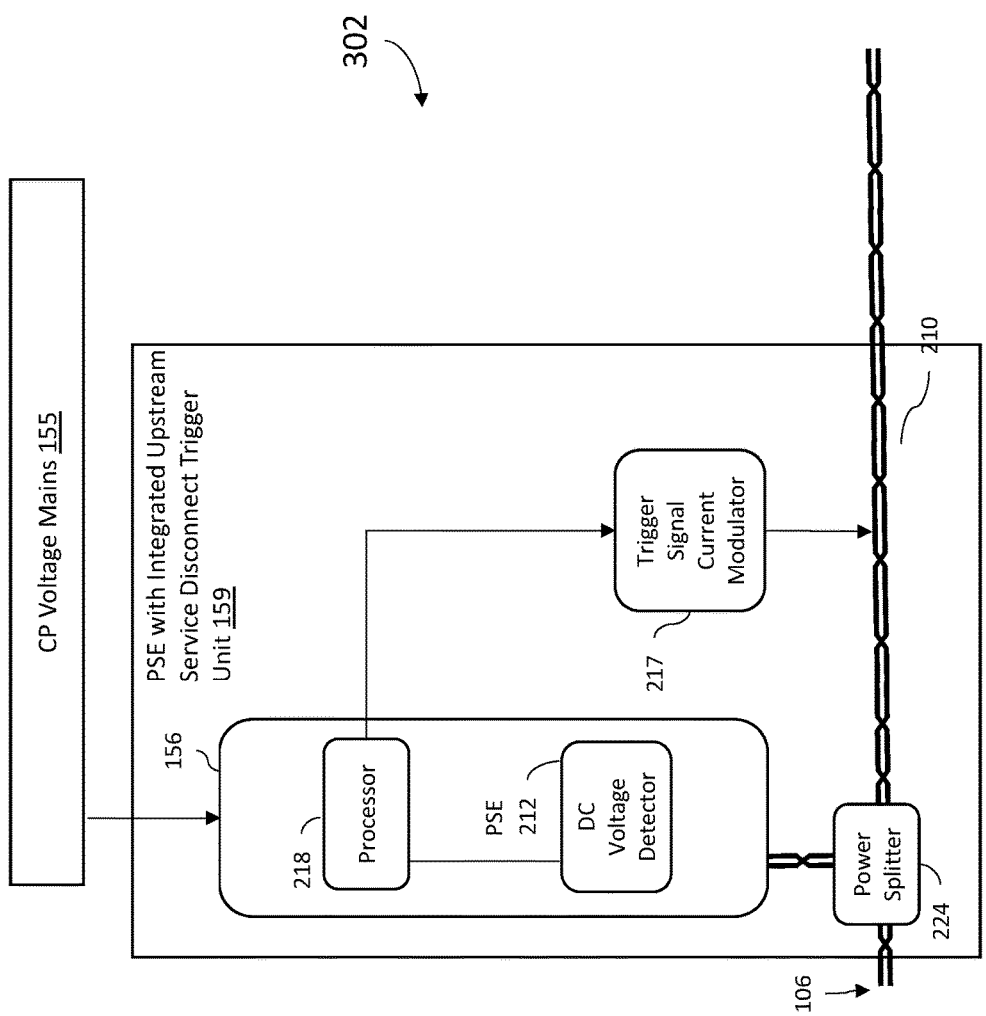
FIG. 3B is a diagram of a Power Sourcing Equipment Device integrated with a Upstream Service Disconnect Trigger Unit of one embodiment of the present disclosure.
Figure 3C:
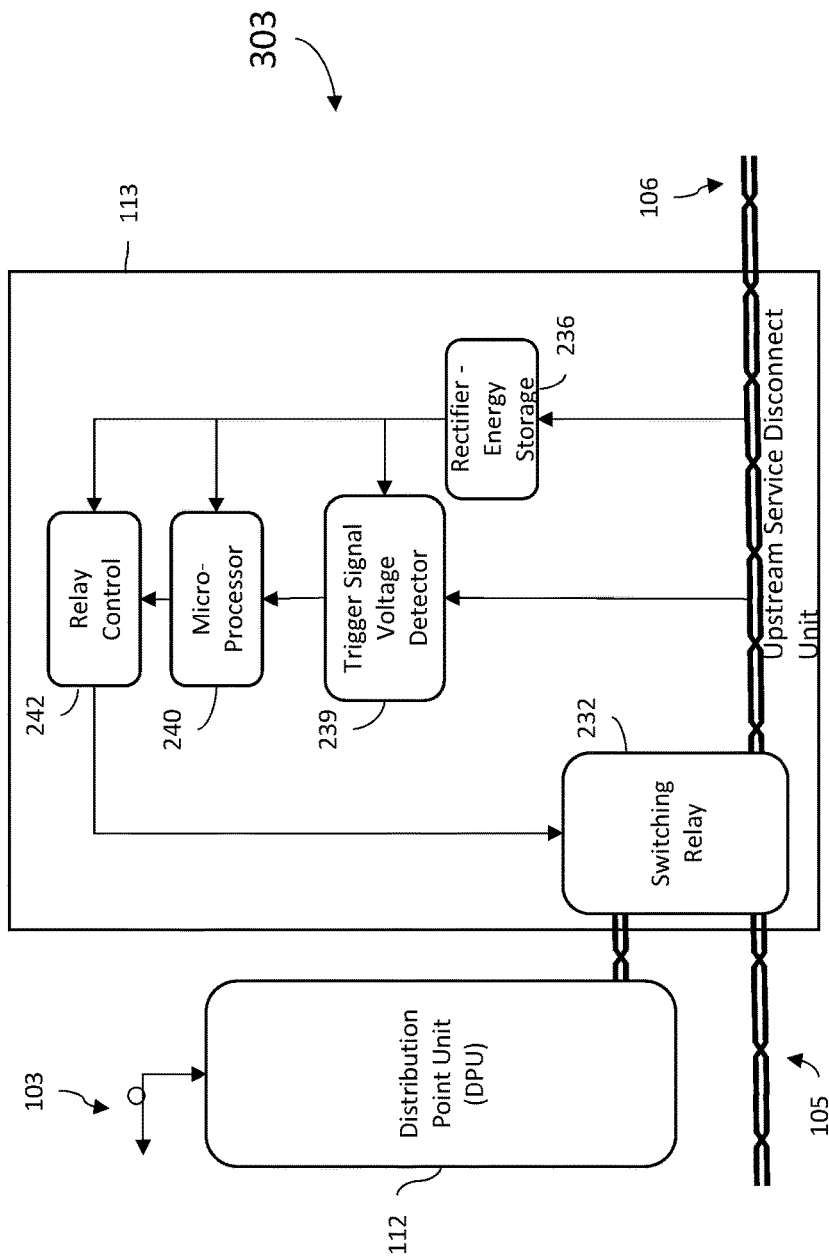
FIG. 3C is a diagram of a Distribution Point Unit paired with a Upstream Service Disconnect Unit of one embodiment of the present disclosure.

FIGS. 3A, 3B and 3C illustrate additional example implementations of Upstream Service Disconnect Unit 113 and Upstream Service Disconnect Trigger Unit 157 where a current modulation is applied to the POTS voltage signal supplied by the upstream service delivery unit 102 to communicate the trigger signal. Starting with FIG. 3A, one example implementation for Upstream Service Disconnect Trigger Unit 157 is shown at 301. Power Sourcing Equipment 156 is also shown, coupled to the conductor span 106 via a power splitter. On activation of the Upstream Service Disconnect Trigger Unit 157 (which may occur upon receiving power from CP Voltage Mains 155, for example) DC Voltage Detector 212 begins to monitor conductor span 106 for the existence of the upstream service delivery unit generated DC voltage signal. When that DC voltage signal is detected, processor 218 activates trigger signal current modulator 217 which modulates a current drawn from conductor span 106. Current draws from conductor span 106 on the order of 2 milliamps or less are below the threshold that the upstream service delivery unit 102 is designed to detect. In one embodiment, trigger signal current modulator 217 draws a small amount of current (e.g. less than 1 milliamp) and modulates the current (with a square or sine wave pattern, for example) between 0-1 mA at a frequency of 100 kHz to 150 kHz, which is outside the voice band. The electrical conductors 105 between the Upstream Service Disconnect Unit 113 and the upstream service delivery unit 102 will have a certain resistance so that the alternating current placed on conductor span 106 will cause a modulation in the voltage on the conductor span 106 as seen by the Upstream Service Disconnect Unit 113.

In one embodiment, Upstream Service Disconnect Trigger Unit 157 may comprise or otherwise be coupled to optional switching relay 210 through which the conductor span 106 may be disconnected from the CPE network before the trigger signal current modulator 217 begins outputting the trigger signal. For example, in one embodiment, processor 218 outputs a signal to controller 220 to operate switching relay 210 (which may comprise a bistable relay device) to disconnect conductor span 106 from the CPE network and instead connect it to the trigger signal current modulator 217 and DC Voltage Detector 212 on activation of the Upstream Service Disconnect Trigger Unit 157 and then begin to monitor conductor span 106 for the existence of the upstream service delivery unit generated DC voltage signal.

FIG. 3B illustrates an alternative implementation at 302 of another PSE with integrated Upstream Service Disconnect Trigger Unit 159 of one embodiment of the present disclosure. The PSE with integrated Upstream Service Disconnect Trigger Unit 159 is functionally identical to the implementation described in FIG. 3A, however the processor 218 and DC voltage detector 212 are implemented using resources within the CPE 156.

In FIG. 3C one example implementation is illustrated at 303 for an Upstream Service Disconnect Unit 113 for use with a current modulated trigger signal such as generated by the trigger signal current modulator 217 discussed in either of FIG. 3A or 3B above. Upstream Service Disconnect Unit 113 comprises Rectifier-energy storage device 236 and a Trigger signal voltage detector 239 coupled to conductor span 106. The alternating voltage signal present on conductor span 106 due to the current modulation of the trigger signal is weak enough not to interfere with upstream service delivery unit 102. The rectifier rectifies the DC voltage from the conductor span 106 because the DC polarity on conductor span 106 is not known, and stores a portion of the energy obtained in the energy storage component. Processor 240, Relay Control 242 and Trigger signal voltage detector 239 are each powered by the charge stored in rectifier-energy storage device 236. When a sufficient charge is available, processor 240 becomes operable. Processor 240 also obtains an input from trigger signal voltage detector 239 to confirm whether the trigger signal is present on conductor span 106. If the trigger signal is present, then the resulting alternating voltage level at the modulation frequency will also be present on conductor span 106. When the trigger signal is present, processor 240 activates relay control 242 to operate switching relay 232 (which may be implemented using a bistable relay). Operation of switching relay 232 electrically disconnects conductor span 106 from the conductor span 105 to the upstream service delivery unit 102 and re-connects conductor span 106 to the DPU 112. In some embodiments, the trigger signal itself may also be modulated with a code or signal by trigger signal current modulator 217. The modulation of the trigger signal may be utilized by trigger signal voltage detector 239 to further confirm the authenticity of the trigger signal or communicate information between the Upstream Service Disconnect Trigger Unit 157 and the Upstream Service Disconnect Unit 113.

As mentioned above, the Upstream Service Disconnect Trigger Units and Power Sourcing Equipment described herein, whether that are implemented separately or together as integrated units, may both be powered from the voltage mains 155 available at the customer premises, or in some implementations may be powered from an alternate source. In some embodiments, the circuitry described herein associated with Upstream Service Disconnect Trigger Units may optionally be powered using the -48 VDC POTS voltage drawn from the conductor span 106 by implementing the elements of the Upstream Service Disconnect Trigger Units using low power devices that cumulatively draw less than the current draw detection threshold of the upstream service delivery unit 102.

Figure 4A:
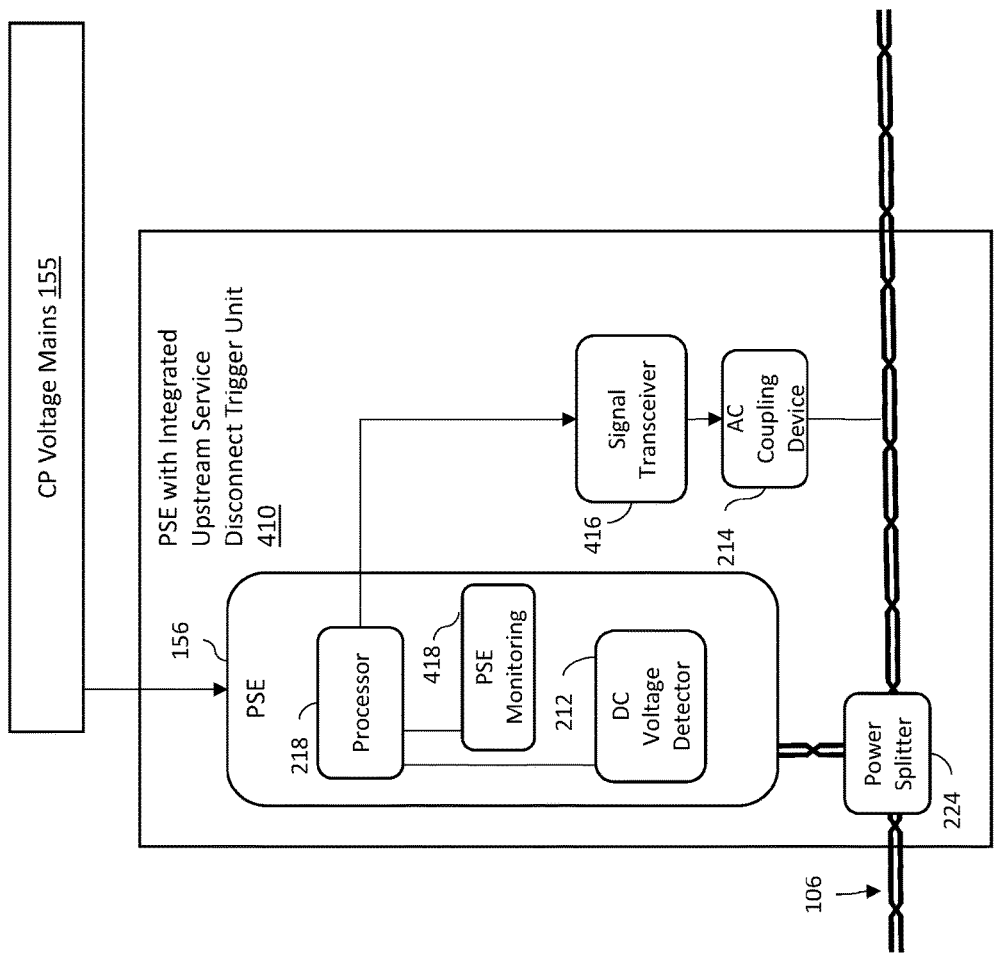
FIG. 4A is a diagram of a Power Sourcing Equipment Device integrated with a Upstream Service Disconnect Trigger Unit of one embodiment of the present disclosure.
Figure 4B:
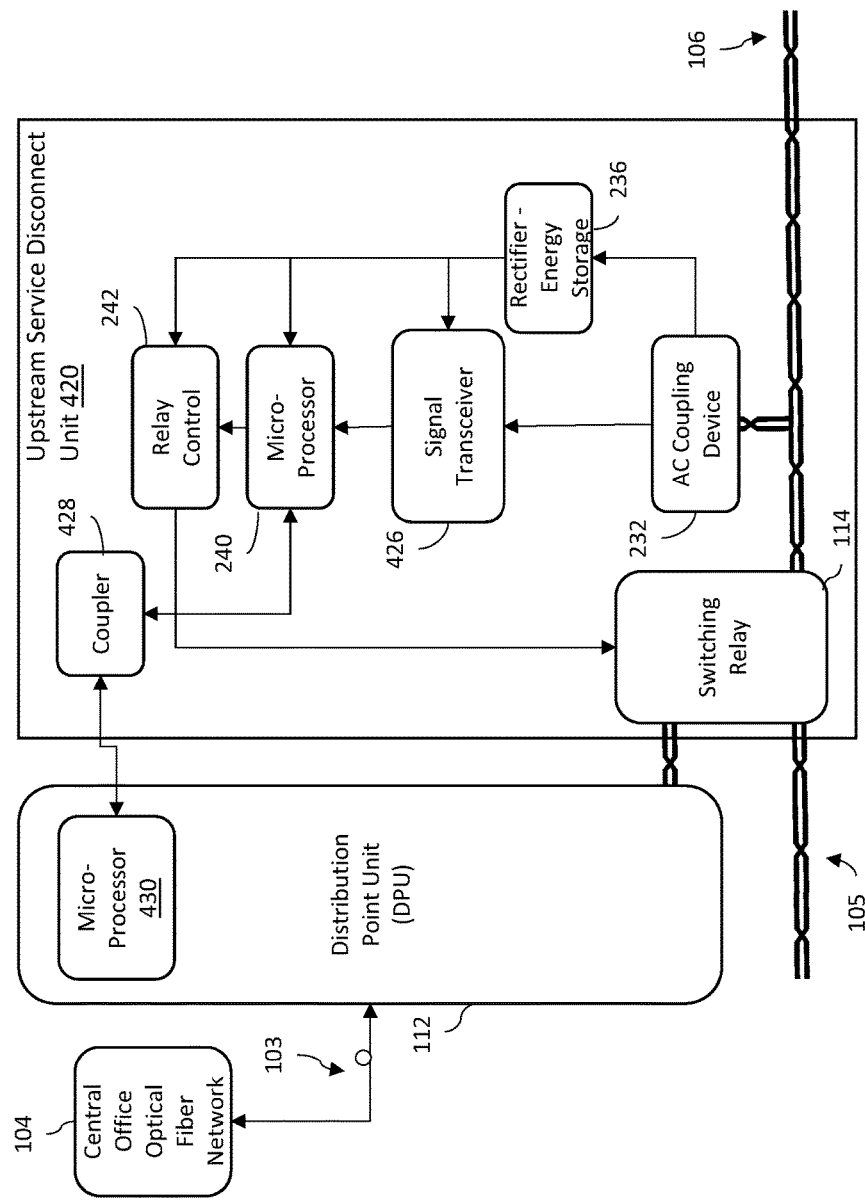
FIG. 4B is a diagram of a Distribution Point Unit paired with a Upstream Service Disconnect Unit of one embodiment of the present disclosure.

It should also be appreciated that the Upstream Service Disconnect Trigger Units and Upstream Service Disconnect Units may also be implemented utilizing Radio-frequency identification (RFID) components to generate, transmit and receive the trigger signal and to realize bidirectional communication and component monitoring. For example, FIGS. 4A and 4B illustrate an optional implementation that provides bidirectional communication between a PSE unit that incorporates an integrated Upstream Service Disconnect Trigger Unit (shown at 410 in FIG. 4A) and an Upstream Service Disconnect Unit 420 (shown in FIG. 4B), and also provides communication with the upstream optical fiber network 104. In this embodiment, both the trigger signal generator in the Upstream Service Disconnect Trigger Unit 410 and the associated trigger signal detector in Upstream Service Disconnect Unit 420 comprise respective bidirectional signal transceivers 416 and 426 (such as an RFID transceiver, for example), although they need not be identical to each other.

The PSE 156 may further comprise PSE Monitoring 418, which is a function that can monitor the operating status of unit 410 and the components thereof. For example, once DSL service is established, PSE Monitoring 418 can monitor the voltage and/or current of the power feed provided to DPU 112 over conductor span 106. PSE Monitoring 418 can monitor the voltage and/or current of the mains 155, whether there is any backup battery present and if so the state of the backup batter. Such information can be transmitted by signal transceivers 416 to signal transceiver 426 over the conductor span 106 on a scheduled basis. Alternatively, a request for such information may be similarly transmitted downstream by signal transceiver 426 to signal transceiver 416.

At Upstream Service Disconnect Unit 420, a coupler 428 provides electrical isolation between the Upstream Service Disconnect Unit 420 circuitry and a microprocessor 430 in the DPU 430. Coupler 428 can be inductive, capacitive or optical (for example, and optocoupler). Through Coupler 428 the information collected by Upstream Service Disconnect Unit 420 from the PSE Monitoring 418 can be transmitted by the DPU 112 upstream to network 104 (for example to a Network Management System).

FIG. 5 is a flow chart illustrating a method 500 of one embodiment of the present disclosure for automated access network distribution point unit powering. It should be understood that method 500 may be implemented using any one of the embodiments described above. As such, elements of method 500 may be used in conjunction with, in combination with, or substituted for any elements of the Upstream Service Disconnect Units, Upstream Service Disconnect Trigger Units, Distribution Point Units, and Power Sourcing Equipment embodiments described above. Further, the description of elements for such elements described above apply to like named elements of method 500 and vice versa. The method begins at 510 with monitoring for the existence of an upstream service delivery unit voltage signal on an electrical conductor span. The method proceeds to 520 where when the upstream service delivery unit voltage signal is detected, generating a trigger signal on the electrical conductor span. The method proceeds to 530 with energizing a processor and operating a switching relay to couple the electrical conductor span with an access network distribution point unit by tapping power of the trigger signal drawn from the electrical conductor span. The method proceeds to 540 with operating power a sourcing equipment device to provide power to the access network distribution point unit via the electrical conductor span in response to the switching relay coupling the electrical conductor span with the access network distribution point unit.

Figure 6:
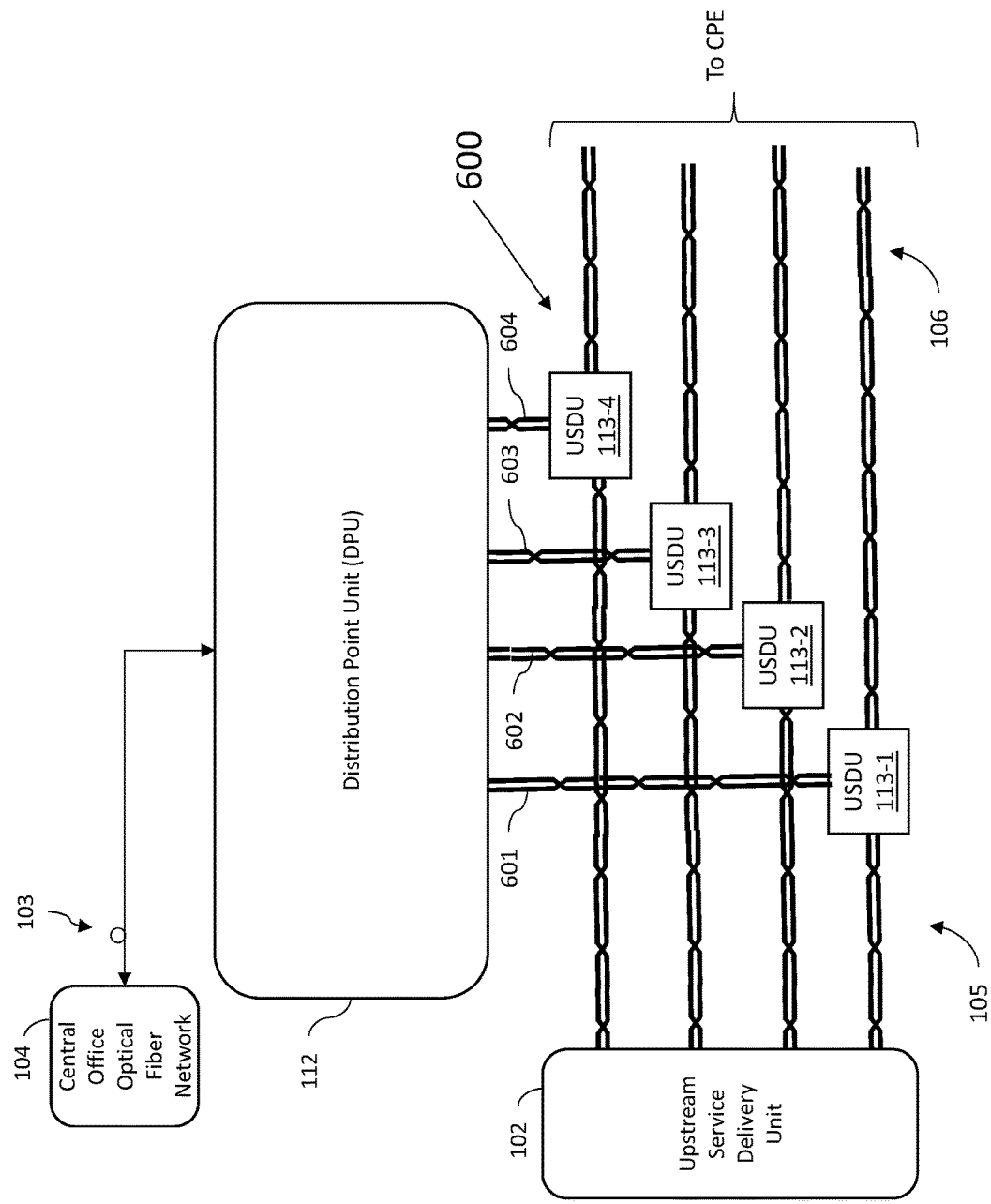
FIG. 6 is a diagram illustrating an alternate implementation of an Upstream Service Disconnect Unit of one embodiment of the present disclosure.

FIG. 6 is a diagram illustrating a cable assembly 600 of one embodiment of the present disclosure that integrates one or more upstream service disconnect units such as any embodiment or implementation of upstream service disconnect unit 113 described above. In this embodiment, the upstream service disconnect unit 113 comprises small electronic circuit that is connected to the twisted pairs electrical conductors going to the DPU 112, the upstream service delivery unit 102, and to the CPE side equipment via conductor span 106. In such an embodiment, upstream service disconnect unit 113 can be overmolded for protection against the environmental influences. As shown in FIG. 6, DPU 112 is coupled to a plurality of cables 601, 602, 603 and 604 (which may be twisted-pair wire cables) each cable comprising a respective upstream service disconnect unit (shown as 113-1 to 113-4). From each respective upstream service disconnect unit 113-1 to 113-4, one twisted-pair conductor set is coupled to the upstream service delivery unit 102 (shown as comprising conductor span 105) and a second twisted-pair conductor set is coupled to the to the CPE side equipment via conductor span 106. In this configuration, each respective upstream service disconnect unit 113-1 to 113-4 may comprise the elements and operate in the manner described with respect to any of the upstream service disconnect unit 113 embodiments or implementations described above.

FIG. 7 is flow chart illustrating another method embodiment at 700 of the present disclosure for automated access network distribution point unit powering. It should be understood that method 700 may be implemented using any one of the embodiments described above. As such, elements of method 700 may be used in conjunction with, in combination with, or substituted for any elements of the Upstream Service Disconnect Units, Upstream Service Disconnect Trigger Units, Distribution Point Units, and Power Sourcing Equipment embodiments described above. Further, the description of elements for such elements described above apply to like named elements of method 700 and vice versa. In one implementation, method 700 may be performed by code executed on the processor of any of the Upstream Service Disconnect Trigger Unit (such as units 157, 158, 159 or 410) discussed above or processors 148 in FIG. 1, 218 in FIG. 2A, 2.B, 3A, 3B, or 4A.

As illustrated in FIG. 7, there are three conditions which may exist with respect to the state of the conductor span 106 when reverse powering of the DPU is initiated: 1) There can be an upstream service voltage (for example, a POTS voltage) on the span 106 which needs to be disconnected and if reverse powering of the DPU 112 is not successful, reconnected. 2) There may no upstream service voltage on the conductor span 106, but span 106 is still connected to the upstream service delivery unit 102, and not to the DPU 112 so that span 106 still needs to be disconnected from the upstream service delivery unit 102 and if reverse powering of the DPU 112 is not successful, reconnected. 3) There may be no upstream service voltage on the conductor span 106 and the span is already directly connected to the DPU 112. In that case, attempt to disconnect from the upstream service delivery unit 102 is required. In case 1, disconnection may be attempted several times. However, when a retry limit is exceeded (and an upstream service voltage still detected), it is still desired to perform a disconnect. The reason is that there may be a "foreign" voltage on the span, (for example, caused by a short with another pair in the cable). Also in this condition it may be desired to revert the switching relay 114 back to its original state.

The method begins at 710 where an Upstream Service Disconnect Trigger Unit that comprises part of broadband access network is powered up or otherwise initialized. If a voltage signal from the upstream service delivery unit 102 is detected, the method proceeds to 712 with initiating a trigger signal. In some embodiments, the trigger signal may be generated by a trigger signal module, trigger signal generator, trigger signal current modulator, signal transceiver, or any similar element discussed above. For example, in one embodiment, processor 148 utilizes DC voltage detector 152 to monitor for a voltage signal from the upstream service delivery unit 102, and when it is detected, processor 148 instructs Trigger Signal Modulator 150 to generate the trigger signal on span 106. Initiating the trigger signal at 712 may also further comprise disconnecting CPE equipment prior to transmitting the trigger signal. For example, in one embodiment at 712, processor 218 activates switching relay 210 prior to activating trigger signal generator 216. If after initiating the trigger signal at 712, the voltage signal from the upstream service delivery unit 102 is still detected, the method may retry initializing the trigger signal at 712. For example, a transient noise or other condition on span 106 may momentarily interfere with the first attempt at sending the trigger signal. In one embodiment, the method may retry initiating the trigger signal up to a limited number of times. If the retry limit is reached and the voltage signal is still detected, then the method proceeds to 718 with initiating reconnection of span 106 to the upstream service delivery unit 102. For example, in one embodiment, processor 148 instructs Trigger Signal Modulator 150 to generate a reconnect signal on span 106 which instructs the Upstream Service Disconnect Trigger Unit 113 to toggle switching relay 114 to reconnect span 106 to the to the upstream service delivery unit 102. The method then proceed to 730 where the method is terminated with the PSE not operational and not injecting power onto span 106.

When initiating the trigger signal does successfully result in disconnection of span 106 from the from the upstream service delivery unit 102, the method proceeds to 714 with initiating the Metallic Detection based Start-Up (MDSU) protocol for power injection. The MDSU protocol is well understood by those of skill in the art of telecommunications and for that reason, not further explained herein. If upon initiation of the MDSU protocol, power up and/or compatible class detection for the power supply unit (PSU) of DPU 112 is confirmed an the expected signature of DPU 112 is detected, then the method proceeds to 716 where Power Sourcing Equipment (PSE) begins operation of power injection into conductor span 106 in order to provide power to DPU 112. Signature detection may comprise, for example, placing a set of test voltages (3 volts and 10 volts) on span 106 and measuring whether and expected resistance is present (10k or 15k). If the expected signature is not detected, that could indicate that no DPU is connected. With respect to power supply classes, the class of the power supply unit (PSU) internal to the power receiving DPU should match or otherwise be compatible with the class of the power sending power supply of the PSE. It should be appreciated that class detection as discussed throughout this disclosure is an optional step based on operator preferences and practices. For example, some network operators may know that all their field installed equipment is of the same or compatible class so that class detection and class compatibility verification is not required. With respect to the class compatibility of the PSU and PSE, this is achieved when the power class of the PSE is equal or higher than that of the PSU in the DPU. When that is the case, the PSE can always supply enough power to the DPU. The case when the power class of the DPU is higher than that of the PSE is to be avoided because then the PSE may not be able to provide enough power to the DPU.

If one or both the expected signature or class detection fails, then the method proceeds to 718 with initiating reconnection of span 106 to the upstream service delivery unit 102 and to 730 where the method is terminated with the PSE not operational and not injecting power onto span 106.

In one embodiment, if after initialization of the Upstream Service Disconnect Trigger Unit at 710 a voltage signal from the upstream service delivery unit 102 is not detected, the method may proceed to 720 with initiating the Metallic Detection based Start-Up (MDSU) protocol for power injection. As before, the method looks for both a signature of the DPU and optionally for detection of the class of the power supply unit in the DPU. If the expected DPU signature is not detected, that may infer that DPU 112 has not been coupled to conductor span 106 even though a voltage from the upstream service delivery unit 102 is not present. Accordingly, the method proceeds to 724 with initiating a trigger signal and then to 726 with again attempting to initiate the MDSU protocol. If the expected DPU signature is still not detected, the Upstream Service Disconnect Trigger may retry a number of times. If the retry limit is reach, the method may proceed to 718 to with initiating reconnection of span 106 to the upstream service delivery unit 102 and to 730 where the method is terminated with the PSE not operational and not injecting power onto span 106. If the expected DPU signature is detected, but the detected class of the PDU in the PDU does not match or is otherwise not compatible with the class of the PSE, then the method will also proceed to 718 to with initiating reconnection of span 106 to the upstream service delivery unit 102 and to 730 where the method is terminated with the PSE not operational and not injecting power onto span 106.

If after initiation of the MDSU protocol at 720, the expected signature of DPU 112 is detected and the power supply class compatibly between the power supply unit (PSU) of DPU 112 and the PSE is confirmed, then the method proceeds to 716 where Power Sourcing Equipment (PSE) begins operation of power injection into conductor span 106 in order to provide power to DPU 112.

It should be noted that in one embodiment, once initialized, the Upstream Service Disconnect Trigger Unit executes a looping off hook detection process 705 that continuously looks for an off-hook condition on the conductor span 106. If an off-hook condition occurs, that indicates the upstream service line (for example, a POTS service) may be in use and method 700 is reinitialized and jumps to 710. One method 700 is completed and arrives at 716, the off-hook detection loop at 705 may be terminated.

It is intended that the disconnect trigger signal produced by the Upstream Service Disconnect Trigger Unit described in this disclosure can be used on lines that have upstream services enabled (such as POTS service for example) as well as on lines without enabled upstream services (for example, lines with a "dry DSL service"). This means that it cannot be assumed that power scavenging from the upstream service delivery unit is necessarily available. Also, the trigger signal may also need to work for the first line being powered, so it cannot be assumed that the DPU has power. Therefore the disconnect trigger signal described herein is able to perform two functions. First, the trigger signal is able to provide power to energize the upstream service disconnect unit, and it carries a communication to trigger disconnection from the upstream service delivery unit and connection of the conductor span to the DPU. The same may be said of the reconnect signal which may be needed to energize and instruct the upstream service delivery unit to reconnect the conductor span to the upstream service delivery unit in the event that an attempted reverse powering of the DPU fails or for other possible circumstances.

FIG. 8A is a flowchart illustrating a method for initiating a trigger signal (such as in block 712 or 724 of method 700, for example). FIG. 8B is a flowchart illustrating initiating a reconnection signal (such as in block 718 or 726 of method 700, for example).

With respect to initiating a trigger signal, the method in FIG. 8A may begin at 810 with disconnecting the CPE. For example, in one embodiment processor 218 activates switching relay 210 to disconnect the DSL Modem 144 or other CPE equipment. As discussed above, disconnecting the CPE may be performed in order to avoid interference from possible DSL services on the line. The relay 210 used to disconnect the CPE equipment may also be the element that will connect the trigger signal generator (such as at 216 in FIG. 2A) conductor span 106. When the start-up procedure is finished, this relay 219 will reconnect the CPE (shown at 814), thereby disconnecting the trigger signal generator so that it will not influence the DSL service from the DPU 112.

The method proceeds to 812 with transmitting the trigger signal. In one embodiment, such as shown at 812, the trigger signal comprises a pre-charge AC signal, followed by a command code (which may comprise a simple on-off keying of the AC signal, for example), followed by a relay charge AC signal.

In order not to interfere with POTS or other upstream service, an out-of-band AC signal may be utilized at each step (pre-charge, command code, and relay charge) in 812. In order to reduce the size of passive coupling components, a higher frequency is preferred. On the other hand the frequency should not be too high to be attenuated too much on a copper conductor pair. As the CPE will be disconnected, an AC signal of higher frequency can be used. In order to minimize influence on DSL services in adjacent pairs in the same cable due to crosstalk, it is preferable to select a frequency in the cross-over band between upstream and downstream PSDs of the DSL service, e.g. 138 kHz or 276 kHz. Use of these frequencies will minimize the effect of cross-talk affecting adjacent conductor spans.

At the DPU end the receiving circuit needs to be relatively high impedance in order not to affect existing DSL services on the span 106. Therefore, in one embodiment, a trigger signal level of around 20 dBm may be used to power up the upstream service disconnect unit 113. For example, in one embodiment, the pre-charge AC signal may be generated and transmitted onto conductor span 106 for about 6 seconds to charge up an energy storage component such as the rectifier energy storage unit 122. Processor 116, Relay Control 118 and Trigger Signal Detector 120 are each powered by the charge stored in rectifier-energy storage device 122. The intent of the pre-charge AC signal is to provide enough energy in energy storage unit 122 so that the upstream service disconnect unit become sufficiently energized that it can receive and decode the command code.

When a sufficient charge is available, processor 116 becomes operable and may then receive and decode the command code. For the command code, simple on-off keying of the AC signal may be utilized. In one embodiment, the keying may be performed at a baudrate of 9600 bps. For example, the command code may comprise a 4 byte command with a 50-100 msec pause between each byte so that the receiving circuit keeps receiving enough power from the AC signal. Sending 1 byte will take less than 1 msec. In other implementations, other byte lengths, baudrates or pause durations may be used. The command code may include error checking, CRC or parity bits, for example. At the receiving end, the low power trigger signal detector and/or processor 116 can decode this modulation. After the command code's bytes are transmitted, a relay charge AC signal is sent that is sufficient to charge up energy storage 122 with enough energy to switch relay 114. For example, the relay charge AC signal may have a duration of 4 seconds. After the command code's bytes are decoded by processor 116, the relay charge AC signal will provide sufficient energy so that relay control 118 can switch the relay 114 that will disconnect the copper pair 105 coming from upstream service delivery unit 102 and connect conductor span 106 it to the DPU 112. In one alternate implementation, instead of the pre-charge, command code, and relay charge sequence shown at 812, the pre-charge and relay charge may proceed the command code such as shown at 812'. In this case, the pre-charge and relay charge may have a sufficient combined duration (10 seconds for example) to store enough of an initial charge in energy storage 122 to power-up disconnect unit 112, decode the command code and switch the relay 114. The CPE disconnected at 810 may then be reconnected at 814. It should be appreciated that the 6 second pre-charge and 4 second relay charge are provided for example purposes and that other durations may be used.

With respect to initiating a reconnect signal, the method at FIG. 8B may begin at 830 with disconnecting the CPE. In one embodiment processor 218 activates switching relay 210 to disconnect the DSL Modem 144 or other CPE equipment. As discussed above, disconnecting the CPE may be performed in order to avoid interference from possible DSL services on the line. The relay 210 used to disconnect the CPE equipment may also be the element that will connect the trigger signal generator (such as at 216 in FIG. 2A) conductor span 106. When the reconnection procedure is finished, this relay 219 will reconnect the CPE (shown at 834).

The method proceeds to 832 with transmitting the reconnect signal. In one embodiment, such as shown at 8322, the trigger signal comprises a pre-charge AC signal, followed by a command code (which may comprise a simple on-off keying of the AC signal, for example), followed by a relay charge AC signal, each of which may be as described in FIG. 8A for the trigger signal. The difference in the reconnect signal from the trigger signal will be in the command code, which will be a different code that instructs disconnect unit 113 to operate relay 114 to reconnect conductor span 106 to the upstream service delivery unit 102 and disconnect it from DPU 112. In one alternate implementation, instead of the pre-charge, command code, and relay charge sequence shown at 832, the pre-charge and relay charge may proceed the command code such as shown at 832'.

EXAMPLE EMBODIMENTS

Example 1 includes an upstream service disconnect unit, the upstream service disconnect unit comprising: a processor; a relay control; and a switching relay coupled to a upstream service delivery unit, a first end of an electrical conductor span, and a access network distribution point unit that is coupled to an optical fiber network, wherein a second end of the electrical conductor span is coupled to a customer premises equipment DSL modem; wherein the upstream service disconnect unit is configured to energize the processor, the relay control, and the switching relay and to operate the switching relay to couple the electrical conductor span with the access network distribution point unit by tapping power of a trigger signal drawn from the electrical conductor span.

Example 2 includes the upstream service disconnect unit of example 1, further comprising a rectifier-energy storage device that is charged by an alternating voltage on the electrical conductor span resulting from the trigger signal; wherein the processor, the relay control, and the switching relay are powered from the rectifier-energy storage device.

Example 3 includes the upstream service disconnect unit of any of examples 1-2, further comprising a trigger signal detector, wherein the processor is configured to operate the switching relay to couple the electrical conductor span with the access network distribution point unit only when the trigger signal detector detects the trigger signal on the electrical conductor span.

Example 4 includes the upstream service disconnect unit of any of examples 1-3, wherein the upstream service disconnect trigger unit comprises a bidirectional transceiver that receives the trigger signal on the electrical conductor span.

Example 5 includes the upstream service disconnect unit of any of examples 1-4, wherein the upstream service disconnect unit is integrated into a cable assembly.

Example 6 includes the upstream service disconnect unit of example 5, wherein the upstream service disconnect unit is integrated into twisted-pair electrical conductor cable assembly.

Example 7 includes an upstream service disconnect trigger unit, the upstream service disconnect trigger unit comprising: a processor; a voltage detector configured to connect to an electrical conductor span; and wherein the processor is configured to detect the existence of a upstream service voltage signal on the electrical conductor span based on an input from the voltage detector and upon detection of the upstream service voltage signal, generate a trigger signal on the electrical conductor span.

Example 8 includes the upstream service disconnect trigger unit of any of examples 7-13, wherein the upstream service disconnect trigger unit is powered from a customer premises voltage mains.

Example 9 includes the upstream service disconnect trigger unit of any of examples 7-13, wherein the upstream service disconnect trigger unit is powered from the upstream service voltage signal.

Example 10 includes the upstream service disconnect trigger unit of any of examples 7-13, wherein the upstream service disconnect trigger unit is coupled to a switching relay, wherein the upstream service disconnect trigger unit is configured to operate the switching relay to disconnect the electrical conductor span from customer premises equipment before generating the trigger signal on the electrical conductor span.

Example 11 includes the upstream service disconnect trigger unit of any of examples 7-13, wherein the upstream service disconnect trigger unit comprises a trigger signal generator that generates the trigger signal by applying an alternating voltage signal to the electrical conductor span.

Example 12 includes the upstream service disconnect trigger unit of any of examples 7-13, wherein the upstream service disconnect trigger unit comprises a trigger signal current modulator that generates the trigger signal by current modulating the upstream service voltage signal on the electrical conductor span.

Example 13 includes the upstream service disconnect trigger unit of any of examples 7-13, wherein the trigger signal is generated at a frequency outside of a voice band used for voice transmissions.

Example 14 includes the upstream service disconnect trigger unit of any of examples 7-13, wherein the upstream service disconnect trigger unit comprises a bidirectional transceiver that generates the trigger signal on the electrical conductor span.

Example 15 includes a power sourcing equipment (PSE) device, the PSE device comprising: a upstream service disconnect trigger unit that includes a voltage detector configured to connect to an electrical conductor span, wherein the upstream service disconnect trigger unit is configured to detect the existence of a upstream service voltage signal on the electrical conductor span and upon detection of the upstream service voltage signal, generate a trigger signal on the electrical conductor span.

Example 16 includes the PSE device of example 15, wherein the upstream service disconnect trigger unit is powered from a customer premises voltage mains.

Example 17 includes the PSE device of any of examples 15-16, wherein the upstream service disconnect trigger unit is powered from the upstream service voltage signal.

Example 18 includes the PSE device of any of examples 15-17, wherein the upstream service disconnect trigger unit is coupled to a switching relay, wherein the upstream service disconnect trigger unit is configured to operate the switching relay to disconnect the electrical conductor span from customer premises equipment before generating the trigger signal on the electrical conductor span.

Example 19 includes the PSE device of any of examples 15-18, wherein the upstream service disconnect trigger unit comprises a trigger signal generator that generates the trigger signal by applying an alternating voltage signal to the electrical conductor span.

Example 20 includes the PSE device of any of examples 15-19, wherein the upstream service disconnect trigger unit comprises a trigger signal current modulator that generates the trigger signal by current modulating the upstream service voltage signal on the electrical conductor span.

Example 21 includes the PSE device of any of examples 15-20, wherein the trigger signal is generated at a frequency outside of a voice band used for voice transmissions.

Example 22 includes the PSE device of any of examples 15-21, wherein the upstream service disconnect trigger unit comprises a bidirectional transceiver that generates the trigger signal on the electrical conductor span.

Example 23 includes the PSE device of example 22, further comprising a power sourcing equipment monitor; wherein the bidirectional transceiver transmits information generated by the power sourcing equipment monitor to one or more upstream devices via bidirectional transceiver.

Example 24 includes a broadband access network, the network comprising: an access network distribution point unit coupled to an optical fiber network; the upstream service disconnect unit of any of examples 1-6 coupled to the access network distribution point unit; a power sourcing equipment device coupled to a second end of the electrical conductor span; and the upstream service disconnect trigger unit of any of examples 7-14 coupled to a second end of the electrical conductor span; wherein the upstream service disconnect trigger unit is configured with the voltage detector to detect the existence of a voltage signal on the electrical conductor span from the upstream service delivery unit and upon detection of the voltage signal, generate the trigger signal on the electrical conductor span; wherein the upstream service disconnect unit is configured to energize its processor and operate the switching relay to couple the electrical conductor span with the access network distribution point unit by tapping power of the trigger signal drawn from the electrical conductor span; and wherein the upstream service disconnect trigger unit is configured to operate the power sourcing equipment device to provide power to the access network distribution point unit in response to the switching relay coupling the electrical conductor span with the access network distribution point unit.

Example 25 includes the network of example 24, wherein the upstream service disconnect trigger unit is integrated into the power sourcing equipment device.

Example 26 includes the network of any of examples 24-25, wherein the upstream service disconnect unit is integrated into the access network distribution point unit.

Example 27 includes a broadband access network, the network comprising: an access network distribution point unit coupled to an optical fiber network; an upstream service disconnect unit coupled to the access network distribution point unit, a upstream service delivery unit, and a first end of an electrical conductor span, wherein the disconnect unit comprises a switching relay that alternately switches either the access network distribution point unit or the upstream service delivery unit to the electrical conductor span; a power sourcing equipment device coupled to a second end of the electrical conductor span; and a upstream service disconnect trigger unit coupled to the coupled to a second end of the electrical conductor span; wherein the upstream service disconnect trigger unit is configured with a voltage detector to detect the existence of a voltage signal on the electrical conductor span from the upstream service delivery unit and upon detection of the voltage signal, generate a trigger signal on the electrical conductor span; wherein the upstream service disconnect unit is configured to energize a processor and operate the switching relay to couple the electrical conductor span with the access network distribution point unit by tapping power of the trigger signal drawn from the electrical conductor span; and wherein the upstream service disconnect trigger unit is configured to operate the power sourcing equipment device to provide power to the access network distribution point unit in response to the switching relay coupling the electrical conductor span with the access network distribution point unit.

Example 28 includes the network of example 27, wherein the upstream service disconnect trigger unit is configured to activate the power sourcing equipment device when the voltage detector detects a loss of the voltage signal.

Example 29 includes the network of any of examples 27-28, wherein the upstream service disconnect trigger unit is integrated into the power sourcing equipment device.

Example 30 includes the network of any of examples 27-29, wherein the upstream service disconnect trigger unit is coupled to a second switching relay, wherein the upstream service disconnect trigger unit is configured to operate the second switching relay to disconnect the electrical conductor span from customer premises equipment.

Example 31 includes the network of any of examples 27-30, wherein the upstream service disconnect trigger unit comprises a trigger signal generator that generates the trigger signal by applying an alternating voltage signal to the electrical conductor span.

Example 32 includes the network of example 31, wherein the trigger signal is generated at a frequency outside of the voice band of the upstream service delivery unit.

Example 33 includes the network of any of examples 27-33, wherein the upstream service disconnect trigger unit comprises a trigger signal current modulator that generates the trigger signal by current modulating the voltage signal on the electrical conductor span.

Example 34 includes the network of any of examples 34, wherein the trigger signal is generated at a frequency outside of the voice band of the upstream service delivery unit.

Example 35 includes the network of any of examples 27-34, wherein the upstream service disconnect unit is configured with a rectifier-energy storage device that is charged by an alternating voltage on the electrical conductor span resulting from the trigger signal.

Example 36 includes the network of any of examples 27-35, wherein the upstream service disconnect unit is integrated into the access network distribution point unit.

Example 37 includes the network of any of examples 27-36, wherein the electrical conductor span comprises at least one set of twisted pair electrical conductors.

Example 38 includes the network of any of examples 27-37, wherein the second end of the electrical conductor span is further coupled to a customer premises equipment (CPE) network.

Example 39 includes the network of any of examples 27-38, wherein the upstream service disconnect trigger unit is powered from a customer premises voltage mains.

Example 40 includes the network of any of examples 27-39, wherein the upstream service disconnect trigger unit is powered from the voltage signal.

Example 41 includes the network of any of examples 27-40, wherein the upstream service disconnect trigger unit comprises a first bidirectional transceiver and the upstream service disconnect unit comprises a second bidirectional transceiver; wherein the first bidirectional transceiver generates the trigger signal and transmits the trigger signal onto the electrical conductor span to the second bidirectional transceiver.

Example 42 includes the network of example 41, wherein the power sourcing equipment device further comprises a power sourcing equipment monitor; wherein the first bidirectional transceiver transmits information generated by the power sourcing equipment monitor to the second bidirectional transceiver.

Example 43 includes the network of example 42, wherein the access network distribution point unit is configured to query the power sourcing equipment monitor for the information by instructing the second bidirectional transceiver to send a request for the information to the first bidirectional transceiver.

Example 44 includes a method for automated Broadband Network Distribution Point Unit Powering, the method comprising: monitoring for an existence of a upstream service delivery unit voltage signal on an electrical conductor span; when the upstream service delivery unit voltage signal is detected, generating a trigger signal on the electrical conductor span; energizing a processor and operating a switching relay to couple the electrical conductor span with an access network distribution point unit by tapping power of the trigger signal drawn from the electrical conductor span; and operating a power sourcing equipment device to provide power to the access network distribution point unit via the electrical conductor span in response to the switching relay coupling the electrical conductor span with the access network distribution point unit.

Example 45 includes the upstream service disconnect trigger unit of any of examples 7-14, wherein the trigger signal comprises: a pre-charge AC signal, a first command code; and a relay charge AC signal.

Example 46 includes the upstream service disconnect trigger unit of any of examples 7-14 and 45 wherein the processor is further configured to detect an activation of a Distribution Point Unit after generating the trigger signal; wherein when activation of the Distribution Point Unit is not detected, the upstream service disconnect trigger unit generates a reconnect signal that comprises: the pre-charge AC signal, a second command code different from the first command code; and the relay charge AC signal.

Example 47 includes the upstream service disconnect trigger unit of any of examples 7-14 and 44-46 wherein the pre-charge AC signal, the first command code, and the relay charge AC signal, comprise one or both of: a frequency of either 138 kHz or 276 kHz; and a signal level of around 20 dBm.

Example 48 includes the upstream service disconnect trigger unit of any of examples 7-14 and 44-47 wherein the first command code comprises a multi-byte on-off keying AC signal.

Example 49 includes the PSE device of any of examples 15-23, wherein the trigger signal comprises: a pre-charge AC signal, a first command code; and a relay charge AC signal.

Example 50 includes the PSE device of any of examples 15-23 and 49 wherein the upstream service disconnect trigger unit is further configured to detect an activation of a Distribution Point Unit after generating the trigger signal; wherein when activation of the Distribution Point Unit is not detected, the upstream service disconnect trigger unit generates a reconnect signal that comprises: the pre-charge AC signal, a second command code different from the first command code; and the relay charge AC signal.

Example 51 includes the PSE device of any of examples 15-23 and 48-50 wherein the first command code comprises a multi-byte on-off keying AC signal.

Example 52 includes the PSE device of any of examples 15-23 and 48-51 wherein the pre-charge AC signal, the first command code, and the relay charge AC signal, comprise one or both of: a frequency of either 138 kHz or 276 kHz; and a signal level of around 20 dBm.

Example 53 includes the network of any of examples 27-44, wherein the trigger signal comprises: a pre-charge AC signal, a first command code; and a relay charge AC signal.

Example 54 includes the network of any of examples 27-44 and 53 wherein the upstream service disconnect trigger unit is further configured to detect an activation of a Distribution Point Unit after generating the trigger signal; wherein when activation of the Distribution Point Unit is not detected, the upstream service disconnect trigger unit generates a reconnect signal that comprises: the pre-charge AC signal, a second command code different from the first command code; and the relay charge AC signal.

Example 55 includes the network of any of examples 27-44 and 52-54 wherein the first command code comprises a multi-byte on-off keying AC signal.

Example 56 includes the network of any of examples 27-44 and 52-55 wherein the pre-charge AC signal, the first command code, and the relay charge AC signal, comprise one or both of: a frequency of either 138 kHz or 276 kHz; and a signal level of around 20 dBm.

Example 57 includes the network of any of examples 27-44 and 52-56 wherein the trigger signal comprises: a pre-charge AC signal, a first command code; and a relay charge AC signal.

Example 58 includes the network of any of examples 27-44 and 52-57 wherein the first command code comprises a multi-byte on-off keying AC signal.

Example 59 includes the network of any of examples 27-44 and 52-58 wherein the pre-charge AC signal, the first command code, and the relay charge AC signal, comprise one or both of: a frequency of either 138 kHz or 276 kHz; and a signal level of around 20 dBm.

In various alternative embodiments, system elements, method steps, or examples described throughout this disclosure (such as the Upstream Service Disconnect Units, Upstream Service Disconnect Trigger Units, Distribution Point Units, Power Sourcing Equipment, or sub-parts thereof, for example) may be implemented using one or more computer systems, field programmable gate arrays (FPGAs), or similar devices comprising a processor coupled to a memory and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An upstream service disconnect unit, the upstream service disconnect unit comprising:
    a processor;
    a relay control; and
    a switching relay coupled to a upstream service delivery unit, a first end of an electrical conductor span, and a access network distribution point unit that is coupled to an optical fiber network, wherein a second end of the electrical conductor span is coupled to a customer premises equipment DSL modem;
    wherein the upstream service disconnect unit is configured to energize the processor, the relay control, and the switching relay and to operate the switching relay to couple the electrical conductor span with the access network distribution point unit by tapping power of a trigger signal drawn from the electrical conductor span.

2. The upstream service disconnect unit of claim 1, further comprising a rectifier-energy storage device that is charged by an alternating voltage on the electrical conductor span resulting from the trigger signal;
    wherein the processor, the relay control, and the switching relay are powered from the rectifier-energy storage device.

3. The upstream service disconnect unit of claim 1, further comprising a trigger signal detector, wherein the processor is configured to operate the switching relay to couple the electrical conductor span with the access network distribution point unit only when the trigger signal detector detects the trigger signal on the electrical conductor span.

4. The upstream service disconnect unit of claim 1, wherein the upstream service disconnect unit comprises a bidirectional transceiver that receives the trigger signal on the electrical conductor span.

5. The upstream service disconnect unit of claim 1, wherein the upstream service disconnect unit is integrated into a cable assembly.

6. The upstream service disconnect unit of claim 5, wherein the upstream service disconnect unit is integrated into twisted-pair electrical conductor cable assembly.

7. An upstream service disconnect trigger unit, the upstream service disconnect trigger unit comprising:
    a processor;
    a voltage detector configured to connect to an electrical conductor span; and
    wherein the processor is configured to detect the existence of an upstream service voltage signal on the electrical conductor span based on an input from the voltage detector and upon detection of the upstream service voltage signal, generate a trigger signal on the electrical conductor span.

8. The upstream service disconnect trigger unit of claim 7, wherein the upstream service disconnect trigger unit is powered from a customer premises voltage mains.

9. The upstream service disconnect trigger unit of claim 7, wherein the upstream service disconnect trigger unit is powered from the upstream service voltage signal.

10. The upstream service disconnect trigger unit of claim 7, wherein the upstream service disconnect trigger unit is coupled to a switching relay, wherein the upstream service disconnect trigger unit is configured to operate the switching relay to disconnect the electrical conductor span from customer premises equipment before generating the trigger signal on the electrical conductor span.

11. The upstream service disconnect trigger unit of claim 7, wherein the upstream service disconnect trigger unit comprises a trigger signal generator that generates the trigger signal by applying an alternating voltage signal to the electrical conductor span.

12. The upstream service disconnect trigger unit of claim 7, wherein the upstream service disconnect trigger unit comprises a trigger signal current modulator that generates the trigger signal by current modulating the upstream service voltage signal on the electrical conductor span.

13. The upstream service disconnect trigger unit of claim 7, wherein the trigger signal is generated at a frequency outside of a voice band used for voice transmissions.

14. The upstream service disconnect trigger unit of claim 7, wherein the upstream service disconnect trigger unit comprises a bidirectional transceiver that generates the trigger signal on the electrical conductor span.

15. The upstream service disconnect trigger unit of claim 7, wherein the trigger signal comprises:
    a pre-charge AC signal,
    a first command code; and
    a relay charge AC signal.

16. The upstream service disconnect trigger unit of claim 15, wherein the processor is further configured to detect an activation of a Distribution Point Unit after generating the trigger signal;
    wherein when activation of the Distribution Point Unit is not detected, the upstream service disconnect trigger unit generates a reconnect signal that comprises:
    the pre-charge AC signal,
    a second command code different from the first command code; and
    the relay charge AC signal.

17. The upstream service disconnect trigger unit of claim 15, wherein the pre-charge AC signal, the first command code, and the relay charge AC signal, comprise one or both of:
    a frequency of either 138 kHz or 276 kHz; and
    a signal level of around 20 dBm.

18. The upstream service disconnect trigger unit of claim 15, wherein the first command code comprises a multi-byte on-off keying AC signal.

19. A power sourcing equipment (PSE) device, the PSE device comprising:
a upstream service disconnect trigger unit that includes a voltage detector configured to connect to an electrical conductor span, wherein the upstream service disconnect trigger unit is configured to detect the existence of a upstream service voltage signal on the electrical conductor span and upon detection of the upstream service voltage signal, generate a trigger signal on the electrical conductor span.

20. The PSE device of claim 19, wherein the upstream service disconnect trigger unit is powered from a customer premises voltage mains.

21. The PSE device of claim 19, wherein the upstream service disconnect trigger unit is powered from the upstream service voltage signal.

22. The PSE device of claim 19, wherein the upstream service disconnect trigger unit is coupled to a switching relay, wherein the upstream service disconnect trigger unit is configured to operate the switching relay to disconnect the electrical conductor span from customer premises equipment before generating the trigger signal on the electrical conductor span.

23. The PSE device of claim 19, wherein the upstream service disconnect trigger unit comprises a trigger signal generator that generates the trigger signal by applying an alternating voltage signal to the electrical conductor span.

24. The PSE device of claim 19, wherein the upstream service disconnect trigger unit comprises a trigger signal current modulator that generates the trigger signal by current modulating the upstream service voltage signal on the electrical conductor span.

25. The PSE device of claim 19, wherein the trigger signal is generated at a frequency outside of a voice band used for voice transmissions.

26. The PSE device of claim 19, wherein the upstream service disconnect trigger unit comprises a bidirectional transceiver that generates the trigger signal on the electrical conductor span.

27. The PSE device of claim 26, further comprising a power sourcing equipment monitor;
wherein the bidirectional transceiver transmits information generated by the power sourcing equipment monitor to one or more upstream devices via bidirectional transceiver.

28. The PSE device of claim 19, wherein the trigger signal comprises:
a pre-charge AC signal,
a first command code; and
a relay charge AC signal.

29. The PSE device of claim 28, wherein the upstream service disconnect trigger unit is further configured to detect an activation of a Distribution Point Unit after generating the trigger signal;
wherein when activation of the Distribution Point Unit is not detected, the upstream service disconnect trigger unit generates a reconnect signal that comprises:
the pre-charge AC signal,
a second command code different from the first command code; and
the relay charge AC signal.

30. The PSE device of claim 28, wherein the first command code comprises a multi-byte on-off keying AC signal.

31. The PSE device of claim 28, wherein the pre-charge AC signal, the first command code, and the relay charge AC signal, comprise one or both of:
a frequency of either 138 kHz or 276 kHz; and
a signal level of around 20 dBm.

32. A broadband access network, the network comprising:
an access network distribution point unit coupled to an optical fiber network;
the upstream service disconnect unit of claim 1 coupled to the access network distribution point unit;
a power sourcing equipment device coupled to a second end of the electrical conductor span; and
the upstream service disconnect trigger unit of claim 7 coupled to a second end of the electrical conductor span;
wherein the upstream service disconnect trigger unit is configured with the voltage detector to detect the existence of a voltage signal on the electrical conductor span from the upstream service delivery unit and upon detection of the voltage signal, generate the trigger signal on the electrical conductor span;
wherein the upstream service disconnect unit is configured to energize its processor and operate the switching relay to couple the electrical conductor span with the access network distribution point unit by tapping power of the trigger signal drawn from the electrical conductor span; and
wherein the upstream service disconnect trigger unit is configured to operate the power sourcing equipment device to provide power to the access network distribution point unit in response to the switching relay coupling the electrical conductor span with the access network distribution point unit.

33. The network of claim 32, wherein the upstream service disconnect trigger unit is integrated into the power sourcing equipment device.

34. The network of claim 32, wherein the upstream service disconnect unit is integrated into the access network distribution point unit.

35. A broadband access network, the network comprising:
an access network distribution point unit coupled to an optical fiber network;
an upstream service disconnect unit coupled to the access network distribution point unit, a upstream service delivery unit, and a first end of an electrical conductor span, wherein the disconnect unit comprises a switching relay that alternately switches either the access network distribution point unit or the upstream service delivery unit to the electrical conductor span;
a power sourcing equipment device coupled to a second end of the electrical conductor span; and
a upstream service disconnect trigger unit coupled to the coupled to a second end of the electrical conductor span;
wherein the upstream service disconnect trigger unit is configured with a voltage detector to detect the existence of a voltage signal on the electrical conductor span from the upstream service delivery unit and upon detection of the voltage signal, generate a trigger signal on the electrical conductor span;
wherein the upstream service disconnect unit is configured to energize a processor and operate the switching relay to couple the electrical conductor span with the access network distribution point unit by tapping power of the trigger signal drawn from the electrical conductor span; and wherein the upstream service disconnect trigger unit is configured to operate the power sourcing equipment device to provide power to the access network distribution point unit in response to the switching relay coupling the electrical conductor span with the access network distribution point unit.

36. The network of claim 35, wherein the upstream service disconnect trigger unit is configured to activate the power sourcing equipment device when the voltage detector detects a loss of the voltage signal.

37. The network of claim 35, wherein the upstream service disconnect trigger unit is integrated into the power sourcing equipment device.

38. The network of claim 35, wherein the upstream service disconnect trigger unit is coupled to a second switching relay, wherein the upstream service disconnect trigger unit is configured to operate the second switching relay to disconnect the electrical conductor span from customer premises equipment.

39. The network of claim 35, wherein the upstream service disconnect trigger unit comprises a trigger signal generator that generates the trigger signal by applying an alternating voltage signal to the electrical conductor span.

40. The network of claim 39, wherein the trigger signal is generated at a frequency outside of the voice band of the upstream service delivery unit.

41. The network of claim 35, wherein the upstream service disconnect trigger unit comprises a trigger signal current modulator that generates the trigger signal by current modulating the voltage signal on the electrical conductor span.

42. The network of claim 41, wherein the trigger signal is generated at a frequency outside of the voice band of the upstream service delivery unit.

43. The network of claim 35, wherein the upstream service disconnect unit is configured with a rectifier-energy storage device that is charged by an alternating voltage on the electrical conductor span resulting from the trigger signal.

44. The network of claim 35, wherein the upstream service disconnect unit is integrated into the access network distribution point unit.

45. The network of claim 35, wherein the electrical conductor span comprises at least one set of twisted pair electrical conductors.

46. The network of claim 35, wherein the second end of the electrical conductor span is further coupled to a customer premises equipment (CPE) network.

47. The network of claim 35, wherein the upstream service disconnect trigger unit is powered from a customer premises voltage mains.

48. The network of claim 35, wherein the upstream service disconnect trigger unit is powered from the voltage signal.

49. The network of claim 35, wherein the upstream service disconnect trigger unit comprises a first bidirectional transceiver and the upstream service disconnect unit comprises a second bidirectional transceiver;
wherein the first bidirectional transceiver generates the trigger signal and transmits the trigger signal onto the electrical conductor span to the second bidirectional transceiver.

50. The network of claim 49, wherein the power sourcing equipment device further comprises a power sourcing equipment monitor;
wherein the first bidirectional transceiver transmits information generated by the power sourcing equipment monitor to the second bidirectional transceiver.

51. The network of claim 50, wherein the access network distribution point unit is configured to query the power sourcing equipment monitor for the information by instructing the second bidirectional transceiver to send a request for the information to the first bidirectional transceiver.

52. The network of claim 35, wherein the trigger signal comprises:
a pre-charge AC signal,
a first command code; and
a relay charge AC signal.

53. The network of claim 52, wherein the upstream service disconnect trigger unit is further configured to detect an activation of a Distribution Point Unit after generating the trigger signal;
wherein when activation of the Distribution Point Unit is not detected, the upstream service disconnect trigger unit generates a reconnect signal that comprises:
the pre-charge AC signal,
a second command code different from the first command code; and
the relay charge AC signal.

54. The network of claim 52, wherein the first command code comprises a multi-byte on-off keying AC signal.

55. The network of claim 54, wherein the pre-charge AC signal, the first command code, and the relay charge AC signal, comprise one or both of:
a frequency of either 138 kHz or 276 kHz; and
a signal level of around 20 dBm.

56. A method for automated Broadband Network Distribution Point Unit Powering, the method comprising:
monitoring for an existence of a upstream service delivery unit voltage signal on an electrical conductor span;
when the upstream service delivery unit voltage signal is detected, generating a trigger signal on the electrical conductor span;
energizing a processor and operating a switching relay to couple the electrical conductor span with an access network distribution point unit by tapping power of the trigger signal drawn from the electrical conductor span; and
operating a power sourcing equipment device to provide power to the access network distribution point unit via the electrical conductor span in response to the switching relay coupling the electrical conductor span with the access network distribution point unit.

57. The method of claim 56, wherein the trigger signal comprises:
a pre-charge AC signal,
a first command code; and
a relay charge AC signal.

58. The method of claim 57, wherein the first command code comprises a multi-byte on-off keying AC signal.

59. The method of claim 57, wherein the pre-charge AC signal, the first command code, and the relay charge AC signal, comprise one or both of:
a frequency of either 138 kHz or 276 kHz; and
a signal level of around 20 dBm.

* * * * *